(12) United States Patent
Sakamoto et al.

(10) Patent No.: US 11,209,361 B2
(45) Date of Patent: Dec. 28, 2021

(54) OPTICAL DENSITY MEASURING APPARATUS AND OPTICAL WAVEGUIDE

(71) Applicant: Asahi Kasei Microdevices Corporation, Tokyo (JP)

(72) Inventors: Toshiro Sakamoto, Tokyo (JP); Tatsushi Yagi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 36 days.

(21) Appl. No.: 16/823,331

(22) Filed: Mar. 19, 2020

(65) Prior Publication Data

US 2020/0309696 A1 Oct. 1, 2020

(30) Foreign Application Priority Data

Mar. 25, 2019 (JP) .............................. JP2019-057277
Jan. 15, 2020 (JP) .............................. JP2020-004486

(51) Int. Cl.
  *G01N 21/59* (2006.01)
  *G01N 21/3504* (2014.01)
  *G02B 6/293* (2006.01)

(52) U.S. Cl.
  CPC ..... *G01N 21/5907* (2013.01); *G01N 21/3504* (2013.01); *G02B 6/29304* (2013.01); *G01N 2021/3536* (2013.01)

(58) Field of Classification Search
  CPC ....... G01N 2021/3536; G01N 21/3504; G01N 21/5907; G01N 21/552; G01N 21/7703; G02B 6/29304; G02B 2006/12107; G02B 2006/12138; G02B 6/1228; G02B 6/124; G02B 6/4214

USPC .................................................. 356/432–448
See application file for complete search history.

(56) References Cited

U.S. PATENT DOCUMENTS

| 7,194,166 B1 | 3/2007 | Gunn, III |
| 2011/0085759 A1* | 4/2011 | Lee ..................... B01J 20/3236 385/12 |
| 2019/0339197 A1* | 11/2019 | Boutami .............. G01N 29/032 |
| 2021/0181103 A1* | 6/2021 | Furuya ................. G02B 6/4215 |

FOREIGN PATENT DOCUMENTS

| JP | H03295037 A | 12/1991 |
| JP | 2003289153 A | 10/2003 |
| JP | 2005300212 A | 10/2005 |
| JP | 2018146568 A | 9/2018 |
| JP | 2019040066 A | 3/2019 |

* cited by examiner

*Primary Examiner* — Tri T Ton
(74) *Attorney, Agent, or Firm* — Kenja IP Law PC

(57) ABSTRACT

An optical density measuring apparatus and an optical waveguide capable of increasing the degree of design freedom are provided. The optical density measuring apparatus is for measuring density of a gas or a liquid to be measured and includes a light source capable of irradiating light into a core layer, a detector capable of receiving light propagated through the core layer, and an optical waveguide. The optical waveguide includes a substrate and the core layer, which includes a diffraction grating unit and a light propagation unit capable of propagating light in an extending direction of the light propagation unit. The diffraction grating unit and a portion of the core layer are separated in the thickness direction of the optical waveguide.

18 Claims, 13 Drawing Sheets

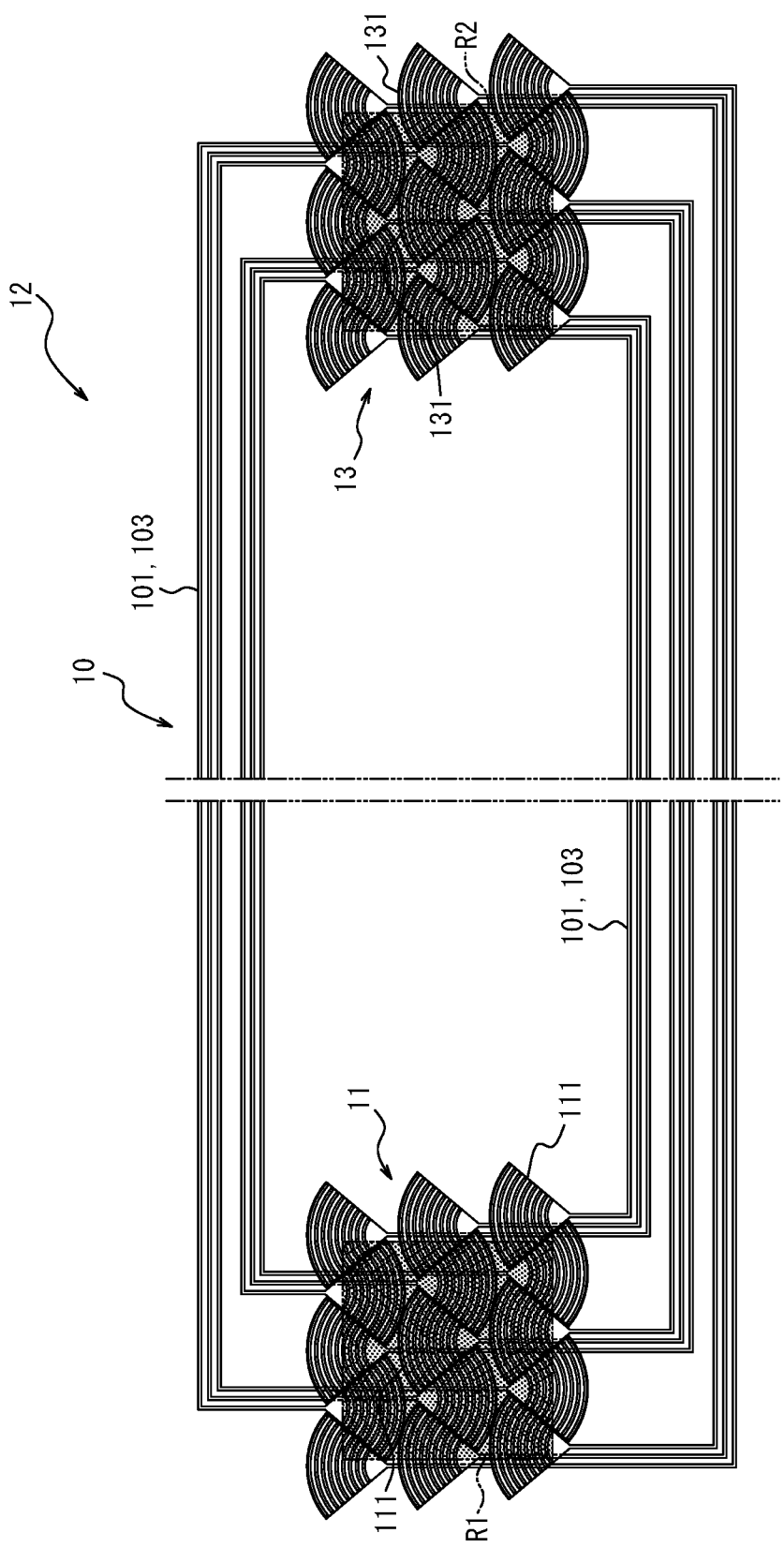

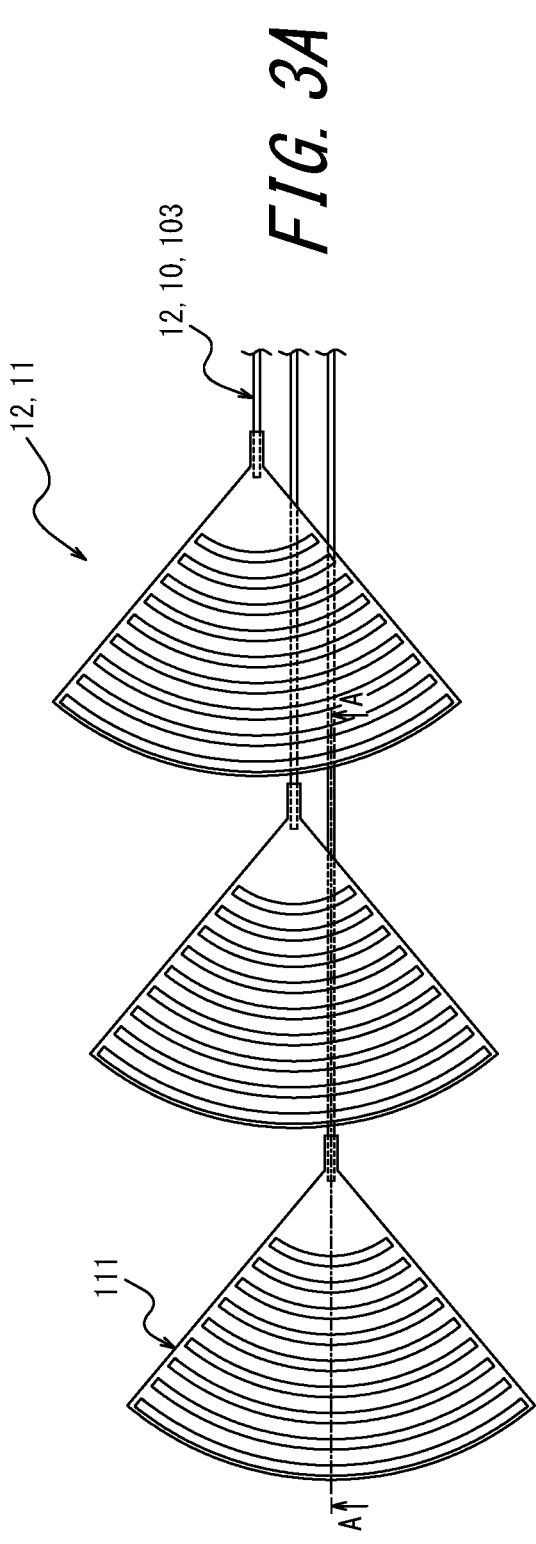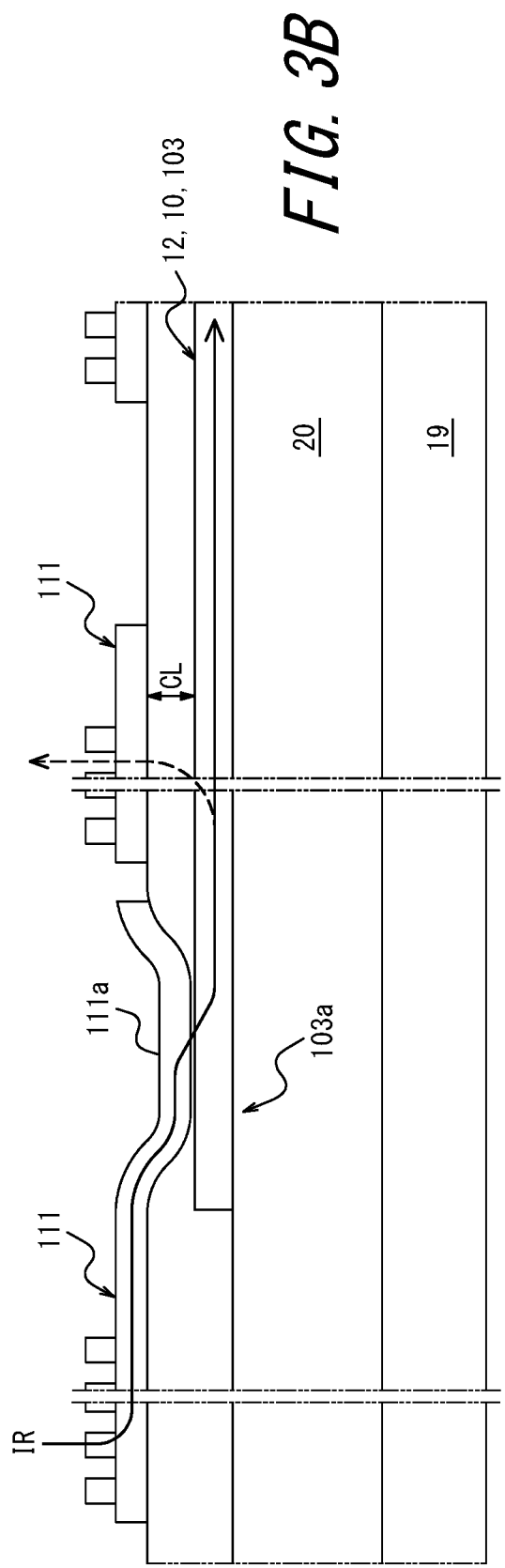

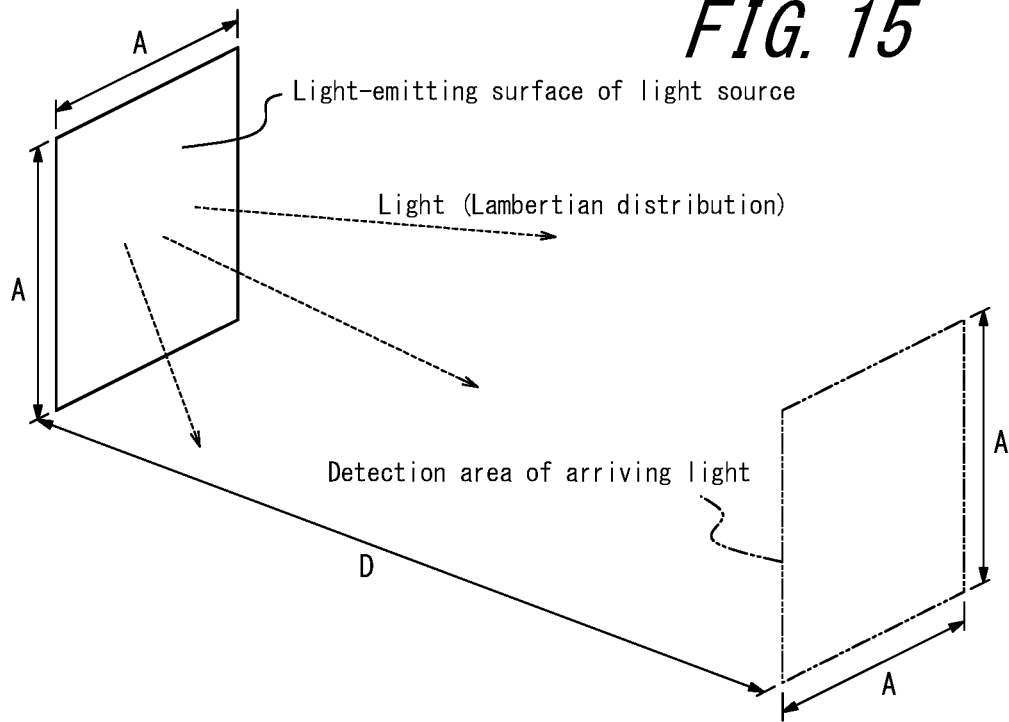
FIG. 15
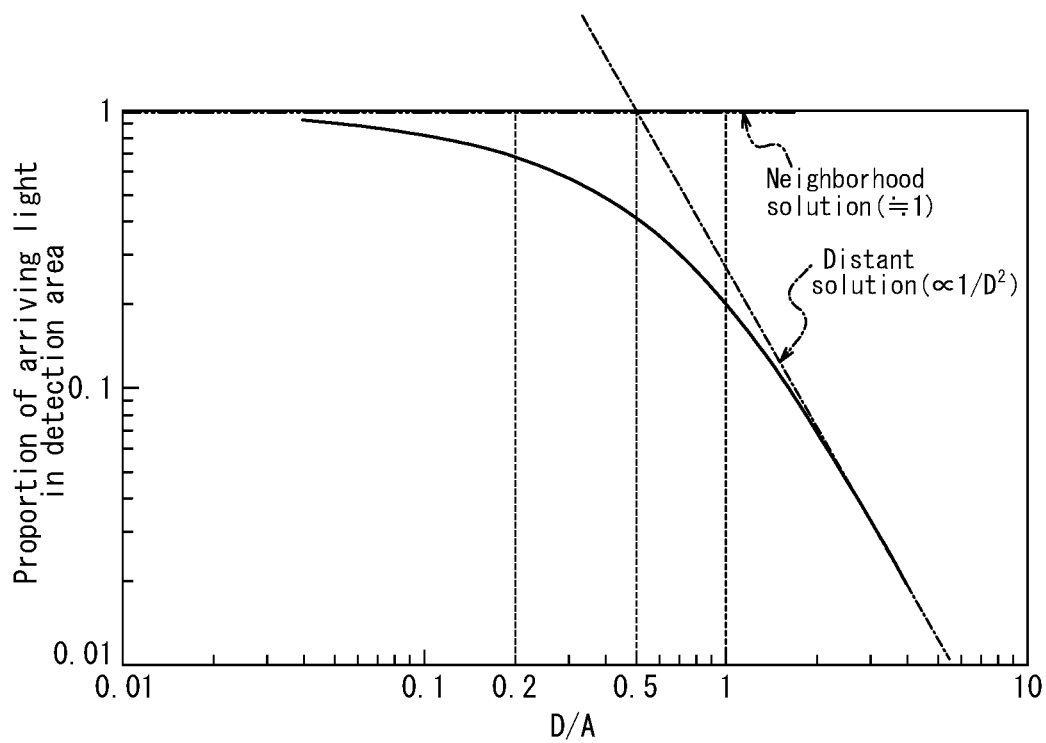

OPTICAL DENSITY MEASURING APPARATUS AND OPTICAL WAVEGUIDE

CROSS-REFERENCE TO RELATED APPLICATIONS

The present application claims priority to and the benefit of Japanese Patent Application No. 2019-057277 filed on Mar. 25, 2019 and Japanese Patent Application No. 2020-004486 filed on Jan. 15, 2020, the entire contents of which are incorporated herein by reference.

TECHNICAL FIELD

The present disclosure relates to an optical density measuring apparatus and an optical waveguide.

BACKGROUND

Light propagating through a structure, such as a thin film formed by crystal or the like, travels while repeatedly being totally reflected at the interface with the outside of the structure when the refractive index of the material forming the structure is greater than the refractive index of the material outside of the structure. When the light propagating through the structure is totally reflected at the interface, the light extends to the outside, which has a smaller refractive index. Such an extension is referred to as an evanescent wave (see FIG. 16). An evanescent wave EW may be absorbed by a substance 52 adjacent to the structure 51 while light L is propagating. This enables detection and identification of the substance 52 in contact with the structure 51 based on a change in the intensity of the light L propagating through the structure 51. An analytical method using the above-described principle of evanescent waves EW is referred to as an attenuated total reflection (ATR) method and is used in chemical composition analysis of the substance 52, for example. Typically, infrared radiation is used as the light to be propagated. Substances have the property of selectively absorbing infrared radiation of particular wavelengths. A substance to be measured can therefore be analyzed or sensed by propagation of infrared radiation in accordance with the absorption spectrum of the substance.

Patent literature (PTL) 1 proposes an optical waveguide sensor in which the ATR method is applied to a sensor. This optical waveguide sensor has a core layer formed on a substrate, allows light to pass through the core layer, and uses an evanescent wave to detect a substance in contact with the core layer.

CITATION LIST

Patent Literature

PTL 1: JP2005-300212A

SUMMARY

In a sensor using the ATR method, a location for introducing light from a light source into the core layer of the optical waveguide and a location for extracting the light from the core layer of the optical waveguide towards a photodetector are necessary. A diffraction grating for bending the optical axis of the light is therefore often provided between the light source and the optical waveguide and between the photodetector and the optical waveguide.

Furthermore, in a sensor using the ATR method, the light introduced into the core layer needs to extend as an evanescent wave from a light propagation unit between the diffraction gratings and be absorbed by the external substance to be measured, as described above. A long propagation distance of light in the light propagation unit (propagation channel) is therefore required. The diffraction grating for input and output of light also needs to have a large size corresponding to the size of the light source and the photodetector. The overall size of the optical waveguide used in the optical density measuring apparatus is therefore a relatively large area.

Accordingly, demand exists for an increase in the degree of design freedom of the core layer, such as the diffraction grating and the light propagation unit, and for efficient placement of each element on the substrate forming the optical waveguide in such a sensor.

It could be helpful to provide an optical density measuring apparatus and an optical waveguide capable of increasing the degree of design freedom.

After careful study, we discovered that such an optical density measuring apparatus and optical waveguide can be provided by separating a diffraction grating unit and a portion of a core layer other than the diffraction grating unit in the thickness direction of an optical waveguide.

The features of the present disclosure are as follows.

One of the disclosed aspects provides an optical density measuring apparatus for measuring density of a gas or a liquid to be measured. The optical density measuring apparatus includes a light source capable of irradiating light into a core layer, a detector capable of receiving light propagated through the core layer; and an optical waveguide. The optical waveguide includes a substrate and the core layer, which includes a diffraction grating unit and a light propagation unit capable of propagating light in an extending direction of the light propagation unit. The diffraction grating unit and a portion of the core layer are separated in a thickness direction of the optical waveguide.

Another one of the disclosed aspects provides an optical waveguide for use in an optical density measuring apparatus for measuring density of a gas or a liquid to be measured. The optical waveguide includes a substrate and a core layer including a diffraction grating unit and a light propagation unit capable of propagating light in an extending direction of the light propagation unit. The diffraction grating unit and a portion of the core layer are separated in a thickness direction of the optical waveguide.

The present disclosure can provide an optical density measuring apparatus and an optical waveguide capable of increasing the degree of design freedom.

BRIEF DESCRIPTION OF THE DRAWINGS

In the accompanying drawings:

FIG. 2 is a plan view illustrating the optical waveguide in FIG. 1 from a light source side or a photodetector side;

FIG. 3A is a plan view, and FIG. 3B is a view of a cross-section taken along line A-A, to illustrate a first diffraction grating unit and a portion of a propagation channel of the optical waveguide in FIG. 2;

FIG. 15 illustrates the proximity arrangement in the optical density measuring apparatus according to the present disclosure;

DETAILED DESCRIPTION

Figure 1:
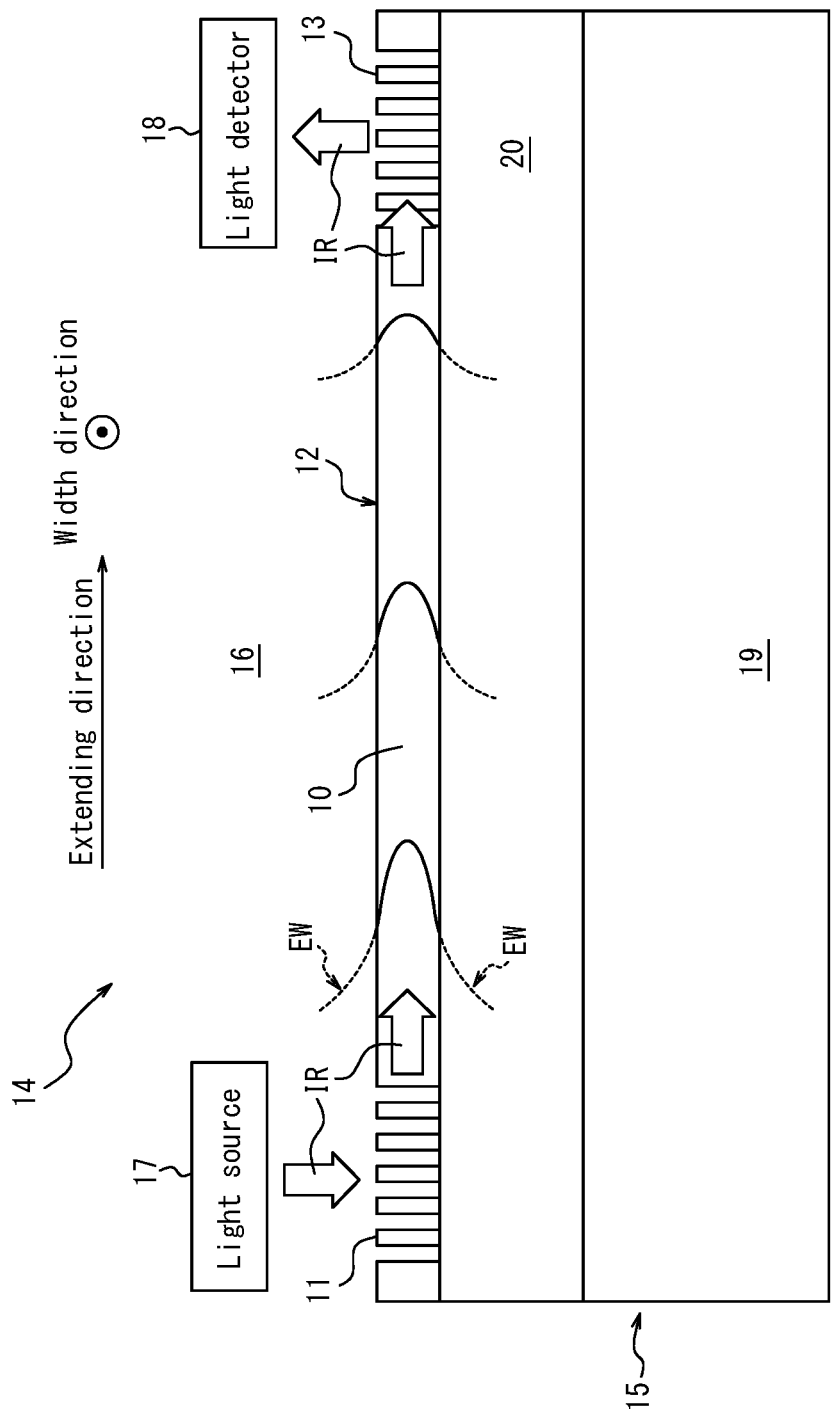
FIG. 1 illustrates the schematic configuration of an optical density measuring apparatus and an optical waveguide according to a first embodiment of the present disclosure.

Embodiments of the present disclosure are now described, but the following embodiments do not limit the claimed subject matter. Furthermore, not all combinations of features described in the embodiments are necessarily essential to the solution to the problem of the present disclosure.

Optical Density Measuring Apparatus

An optical density measuring apparatus according to an embodiment of the present disclosure includes an optical waveguide, described below, according to an embodiment of the present disclosure, a light source capable of irradiating light into a core layer, and a detector capable of receiving light propagated through the core layer.

The constituent elements of the optical density measuring apparatus are described below with examples.

Optical Waveguide

The optical waveguide according to an embodiment of the present disclosure is an optical waveguide used in an optical density measuring apparatus that measures the density of a gas or a liquid to be measured. The optical waveguide includes a substrate and a core layer that includes a light propagation unit, through which light can be propagated in an extending direction of the light propagation unit, and a diffraction grating unit. The diffraction grating unit and a portion of the core layer are separated in the thickness direction of the optical waveguide. Furthermore, the diffraction grating unit of the optical waveguide can include a first diffraction grating unit that receives light from a light source and guides the light towards the light propagation unit and a second diffraction grating unit that takes in the light from the light propagation unit and outputs the light to the detector.

In the optical waveguide according to the present embodiment, the diffraction grating unit and a portion of the core layer are separated in the thickness direction of the optical waveguide, allowing the diffraction grating unit to be arranged freely with respect to the portion of the core layer. This allows an increase in the degree of design freedom of the optical waveguide and the optical density measuring apparatus using the optical waveguide. The thickness direction of the separated optical waveguide is, for example, the thickness direction of the optical waveguide towards the substrate side from the diffraction grating unit.

The thickness direction of the optical waveguide is also referred to simply as the thickness direction in the present disclosure.

In the present embodiment, the extending direction refers to at least one direction in which an object extends. For example, in a three-dimensional structure, the path of shortest distance from one end to another end (or any one point to any other point) while in contact with the three-dimensional structure is the extending direction. Alternatively, the direction that minimizes the change in cross-sectional area from one end to another end (or any one point to any other point) may be the extending direction. The extending direction need not be linear and may be a curve.

The diffraction grating unit and the portion of the core layer being separated in a thickness direction of the optical waveguide refers to that a portion of the diffraction grating unit and a portion of the core layer overlap in plan view of the optical waveguide, and the diffraction grating unit and a portion of the core layer have a two-story structure as viewed from a direction orthogonal to the thickness direction. The diffraction grating unit and the portion of the core layer separated from the diffraction grating unit are included in the core layer of the optical waveguide and can therefore be connected inside the optical waveguide.

Any material (including the case of air) with a refractive index relatively lower than that of the diffraction grating unit and the core layer may be present between the diffraction grating unit and the portion of the core layer separated from the diffraction grating unit. The distance between the diffraction grating unit and the portion of the core layer may be set to any value.

The portion of the core layer refers, for example, to a portion of the light propagation unit of the core layer or a portion of the diffraction grating unit.

In the present embodiment, a separation distance CL measured along the thickness direction between the diffraction grating unit and the portion of the core layer separated from the diffraction grating unit can satisfy Expression (1).

$$CL \geq \frac{3\lambda}{2\pi\sqrt{n_{core}^2 - n_{clad}^2}} \quad (1)$$

In Expression (1), $\lambda$ represents the average wavelength of light in a vacuum, $n_{core}$ represents the refractive index of the material forming the portion of the core layer, and $n_{clad}$ represents the refractive index of the material located in a separation portion between the diffraction grating unit and the portion of the core layer separated from the diffraction grating unit. The right side of Expression (1) specifies a value three times the generally defined extending distance of evanescent light. The extending distance of the evanescent light refers to the distance, from the surface of the portion of the core layer in the thickness direction, of the position where the energy of light diminishes to 1/e from the energy value at the surface of the portion of the core layer. In other words, CL in Expression (1) indicates the distance, from the surface of the portion of the core layer, of the position where the energy of light diminishes to $(1/e)^3$ or less from the energy value at the surface of the portion of the core layer.

In the present embodiment, the separation distance CL measured along the thickness direction between the diffraction grating unit and the portion of the core layer separated from the diffraction grating unit can satisfy Expression (2).

$$CL \geq \left(\frac{1}{2}\ln\frac{\lambda L_{Gr}}{\pi n_{core} d^2}\right)\frac{\lambda}{2\pi\sqrt{n_{core}^2 - n_{clad}^2}} \quad (2)$$

In Expression (2), $\lambda$ represents the average wavelength of light in a vacuum, $n_{core}$ represents the refractive index of a material forming the portion of the core layer, $n_{clad}$ represents the refractive index of the material located in a separation portion between the diffraction grating unit and the portion of the core layer separated from the diffraction grating unit, d represents a minimum film thickness of the portion of the core layer, and $L_{Gr}$ is the sum of the diffraction grating length of the diffraction grating unit separated from the portion of the core layer in the thickness direction. The "sum of the diffraction grating length of the diffraction grating unit separated from the portion of the core layer in the thickness direction" refers to the length, in plan view, of the portion of an intake unit (of the diffraction grating of the diffraction grating unit, as described below) that overlaps the portion of the core layer, or the sum of the length of overlapping portions when the intake units of a plurality of diffraction gratings overlap the portion of the core layer. This length is measured in the extending direction of the portion of the core layer.

The right side of Expression (1) specifies a value three times the generally defined extending distance of evanescent light. In Expression (2), however, the separation distance is specified as a function of the minimum (d) film thickness of the portion of the core layer and the sum of the diffraction grating length of the diffraction grating unit separated from the portion of the core layer in the thickness direction.

Expression (2) is derived as follows. For example, according to published literature ("Wave Optics", SAKAI Jun'ichi, Kyoritsu Shuppan, 2004, p. 170), the thickness of the optical waveguide is d, and the coupling length $L_c$ (the distance at which light transitions from one optical waveguide to another optical waveguide through coupling by the evanescent waves) of two parallel optical waveguides separated by a distance CL is given by Expression (3) below. If the diffraction grating length $L_{Gr}$ is sufficiently shorter than the coupling length $L_c$, however, light does not transition from the portion of the core layer to the diffraction grating unit and is not re-irradiated. Here, u is the lateral standardized propagation constant of the core, w is the lateral standardized propagation constant of the cladding, and $\gamma$ is the lateral propagation constant of the cladding. The case of coupling by evanescent waves is also referred to below simply as evanescent coupling.

$$L_c = \frac{\pi^2 d^2 n_{core}(1+w)}{2\lambda uw \sin(2u)}\exp(\gamma CL) \quad (3)$$

Here, Expressions (4), (5), and (6) follow, assuming that $L_{Gr} < L_c$ and that $d \gg \lambda$ yielding an extreme state of weak evanescent coupling, which light is sufficiently confined in the portion of the core layer.

$$u \cong \frac{\pi}{2} \quad (4)$$

$$v = \frac{k_0 d}{2}\sqrt{n_{core}^2 - n_{clad}^2} \quad (5)$$

$$\gamma = \frac{2\pi}{\lambda_0}\sqrt{n_{core}^2 - n_{clad}^2} \quad (6)$$

Expression (2) is obtained by using Expressions (4), (5), and (6) to transform and simplify Expression (3).

This allows specification of the minimum separation distance CL for light not to yield evanescent coupling between the diffraction grating unit and the portion of the core layer, regardless of the film thickness of the portion of the core layer or the sum of the diffraction grating length of the diffraction grating unit separated from the portion of the core layer in the thickness direction. In Expressions (1) and (2), $n_{core}$ is approximately 3.4 when the portion of the core layer is formed from Si, and $n_{clad}$ is approximately 1.4 when the material located in the separation portion is $SiO_2$. When a plurality of materials are located in the separation portion, the refractive index of the material with the lowest refractive index among the materials forming the separation portion can be applied as $n_{clad}$.

In the present embodiment, the separation distance CL can be set to 0.7 μm or more. For example, in an optical density measuring apparatus for detecting $CO_2$, which is a gas typically floating in the environment, infrared radiation with a wavelength of approximately 4.3 μm in a vacuum is typically used. When $n_{core}$ is 3.4 and $n_{clad}$ is 1.4 as described above, the right side of Expression (1) becomes approximately 0.66 μm. Setting CL to 0.7 μm or more can avoid evanescent coupling between the portion of the core layer and the diffraction grating unit.

In the present embodiment, setting the separation distance CL to the aforementioned predetermined length allows light, propagating through a portion of the core layer in a sensor using the optical waveguide, to propagate through the portion of the core layer without evanescent coupling with the core layer forming the diffraction grating unit located at a position separated from the portion of the core layer in the thickness direction. Specifically, when the separation distance CL is short, light propagating through the portion of the core layer separated from the diffraction grating unit extends from the portion of the core layer as an evanescent wave, propagates to the diffraction grating unit separated from the portion of the core layer, and may be re-irradiated from the diffraction grating unit. This leads to loss of light propagating through the core layer. Even if the light propagating through the portion of the core layer extends as an evanescent wave, propagation to the diffraction grating unit can be suppressed by the separation distance CL being set to the aforementioned predetermined length. The loss of light can therefore be prevented, improving sensitivity of the sensor.

In the present embodiment, the portion of the core layer separated from the diffraction grating unit can have a thickness of 0.3 μm or more at a position separated from the diffraction grating unit in the thickness direction. By the thickness being set in this way, less of the light propagating through the portion of the core layer extends as an evanescent wave, and propagation of light to the diffraction grating unit can be suppressed. The loss of light can therefore be prevented, improving sensitivity of the sensor.

In the optical waveguide of the present embodiment, the separation distance CL is the length, in the thickness direction, measured from the surface of the diffraction grating unit on the side of the portion of the core layer to the surface of the portion of the core layer on the diffraction grating unit side. The thickness of the portion of the core layer separated from the diffraction grating unit is the length, measured along the thickness direction, of the core layer at the position where the core layer is separated from the diffraction grating unit in the thickness direction.

In the present embodiment, the portion of the core layer and the diffraction grating unit may be formed from any materials, but the diffraction grating unit and the portion of the core layer are preferably formed from different materials. The reason is that in cases such as when the portion of the core layer separated from the diffraction grating unit is formed as a light propagation unit, the functions required for the diffraction grating unit and the light propagation unit differ. Hence, forming these components from different materials enables materials to be chosen to suit the function required for each component and also allows the optical waveguide of the present embodiment to be manufactured more easily. In the present disclosure, different materials refer not only to the case of different elements, but also to a different crystal state of the same elements. This is because, in optical terms, light propagation phenomena differ if the crystal state differs, even if the constituent elements of the materials are the same.

In the present embodiment, the optical waveguide may be formed so that a first portion that is a portion of the core layer is separated from the diffraction grating unit in the thickness direction, and a second portion that is a portion of the core layer is separated from the first portion in the thickness direction (in other words, so that the diffraction grating unit, the first portion, and the second portion have a three-story structure when viewed in a direction orthogonal to the thickness direction).

Adopting this configuration in the present embodiment can further increase the degree of design freedom. The thickness direction of the first portion relative to the diffraction grating unit is, for example, the thickness direction on the substrate side, and the thickness direction of the second portion relative to the first portion is, for example, the thickness direction on the substrate side.

Furthermore, as described above, the diffraction grating unit of the optical waveguide can include a first diffraction grating unit that receives light from a light source and guides the light towards the light propagation unit and a second diffraction grating unit that takes in the light from the light propagation unit and outputs the light to the detector. In the present embodiment, stating that the first diffraction grating unit guides light towards the light propagation unit (i.e. that the light propagation unit takes in light from the first diffraction grating unit) or that the light propagation unit guides light towards the second diffraction grating unit (i.e. that the second diffraction grating unit takes in light from the light propagation unit) means that as long as light can propagate between the first/second diffraction grating units and the light propagation unit, the form in which these units are connected is not limited. For example, these units may be continuously connected by the same material (the same crystal state) without gaps or may be optically continuous. Examples of being optically continuous include these units being discontinuous by being formed from different materials (including the case of the same element having a different crystal state) but being optically continuous as a result of being positioned coaxially, and these units being discontinuous by not being positioned coaxially (being disjoint) but being coupled by an evanescent wave, as in a directional coupler. A directional coupler refers to an optically coupled state by using an evanescent wave such that the travel direction of light does not change during a transition when the light transitions from one side to another. In the present disclosure, a state in which light can be guided and taken in between the diffraction grating unit and the light propagation unit is also simply referred to as the diffraction grating unit and the light propagation unit being connected.

The constituent elements of the optical waveguide are described below with examples.

Core Layer

In the present disclosure, the core layer includes a light propagation unit capable of propagating light in an extending direction of the light propagation unit and a diffraction grating unit.

Any material may be used in the core layer. Examples of materials included in the core layer include monocrystalline silicon and polycrystalline silicon, amorphous silicon, silicon nitride, silicon germanium, germanium, gallium arsenide, indium phosphide, indium antimony, indium gallium arsenide, indium gallium phosphide, indium fluoride, diamond, sapphire, lithium niobate, and chalcogenide glass. The core layer may be a single-layered film or may be a multilayer film.

The diffraction grating unit and the light propagation unit may be formed from different materials. In this case, the material forming the light propagation unit is preferably monocrystalline silicon, and the material forming the diffraction grating unit preferably includes polycrystalline silicon or amorphous silicon. Silicon is the most common material, and this configuration can reduce propagation loss in the light propagation unit and easily increase the degree of freedom for processing the diffraction grating unit.

Furthermore, a cross-section perpendicular to the extending direction of the core layer at an arbitrary position along the extending direction may, for example, have a shape in which the distance from the center of the core layer to the outer surface in the cross-section varies, such as a rectangle, or a shape in which the distance from the center of the core layer to the outer surface in the cross-section does not vary, i.e. a circle.

In the present embodiment, at least a portion of the core layer may be exposed or covered by a thin film. Consequently, the portion of the core layer that is exposed or covered can come into direct contact with the gas or liquid to be measured, or can come into contact with the gas or liquid to be measured via the thin film. This enables the evanescent wave and the gas or liquid to be measured to interact, thereby enabling measurement of the density of the gas or liquid to be measured. In the present embodiment, the thin film is preferably thinner than ¼ of the wavelength, in a vacuum, of the light propagating through the core layer.

In the present embodiment, the light propagating through the core layer may be infrared radiation serving as an analog signal. Infrared radiation serving as an analog signal does not refer to determining the change in the energy of light to be one of two values, i.e. 0 (low level) or 1 (high level), but rather to a signal that carries the amount of change in the energy of light. The optical waveguide according to the present embodiment can therefore be used in sensors or analysis equipment. In this case, the wavelength of the infrared radiation in a vacuum may be from 2 μm or more to less than 12 μm. This is a wavelength band absorbed by gases ($CO_2$, CO, NO, $N_2O$, $SO_2$, $CH_4$, $H_2O$, $C_2H_2O$, and the like) that are typically floating in the environment. Accordingly, the optical waveguide according to each embodiment can be used as a gas sensor.

The core layer may include a curved portion. This enables the aspect ratio of the contour of the core layer to approach 1 in plan view of the entire core layer, enabling miniaturization of the optical waveguide and the optical density measuring apparatus.

Light Propagation Unit

In the present embodiment, the light propagation unit has a propagation channel capable of propagating light in the extending direction of the light propagation unit. A cross-section perpendicular to the extending direction of the propagation channel at an arbitrary position along the extending direction may, for example, have a shape in which the distance from the center of the core layer to the outer surface in the cross-section varies, such as a rectangle, or a shape in which the distance from the center of the core layer to the outer surface in the cross-section does not vary, i.e. a circle.

The propagation channel in the present embodiment may have a substantially uniform film thickness in the extending direction. A substantially uniform film thickness refers, for example, to the height difference in the film thickness being 200 nm or less. The propagation channel may have a portion with a different width along the extending direction. When the light propagation unit includes a plurality of propagation channels, the propagation channels may have different film thicknesses and widths. The film thickness of the core layer may or may not be uniform throughout the light propagation unit.

Diffraction Grating Unit

In the present embodiment, the diffraction grating unit can include a first diffraction grating unit that receives light from a light source and guides the light towards the light propagation unit and a second diffraction grating unit that takes in the light from the light propagation unit and outputs the light to the detector. The first diffraction grating unit may include a plurality of first diffraction gratings, and at least two first diffraction gratings among the plurality of first diffraction gratings may be positioned to receive light emitted from the same light-emitting surface of the light source. The second diffraction grating unit may include at least one second diffraction grating that takes in light from the light propagation unit and outputs the light to the detector.

As a result of the first diffraction grating unit having a plurality of first diffraction gratings, and at least two first diffraction gratings among the plurality of first diffraction gratings being positioned to receive light emitted from the same light-emitting surface of the light source, the optical waveguide according to the present embodiment can very efficiently couple the light-emitting element and the optical waveguide.

Specifically, a light source (light-emitting element) such as an infrared LED that can be used in a sensor based on the ATR method often has a light-emitting surface with a relatively large area, such as 100 μm×100 μm, or even a very large area of several mm×several mm. To increase the light introduction efficiency and light extraction efficiency, the diffraction grating is also required to function at approximately the same size as the light receiving/emitting surfaces of the light source and photodetector that are used. From this perspective, the size of the diffraction grating needs to be made very large to match the light-emitting surface so that the light-emitting element of the light source and the diffraction grating can be approximately the same size.

Figure 17A:
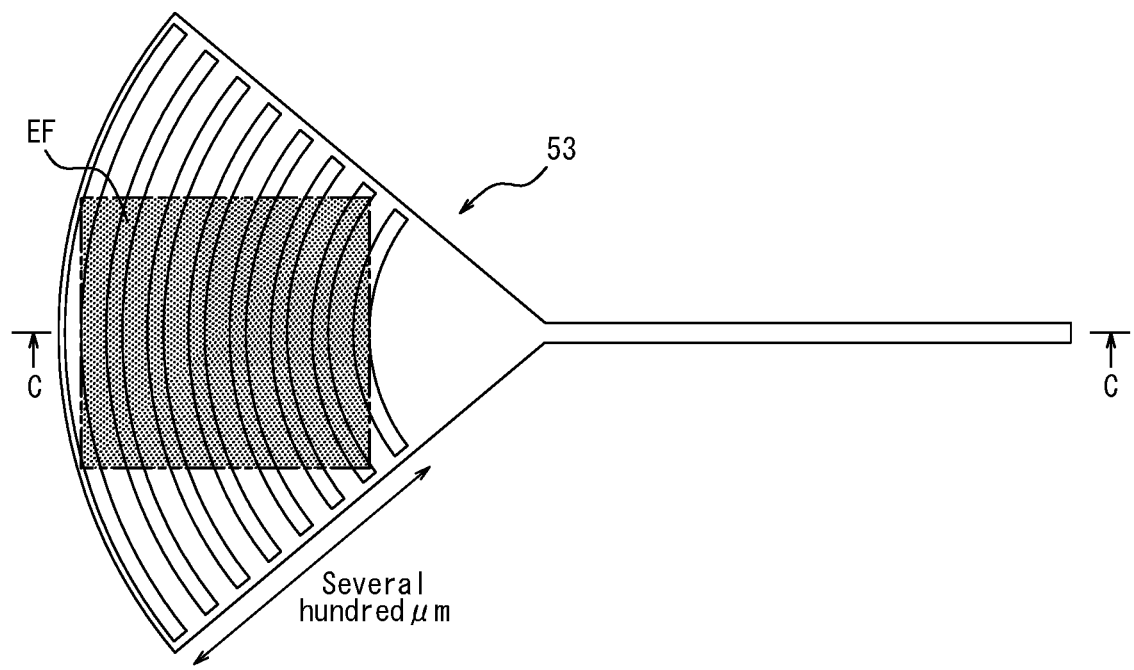
FIG. 17A is a plan view illustrating an example diffraction grating that is larger than the light-emitting surface of a light-emitting element.
Figure 17B:
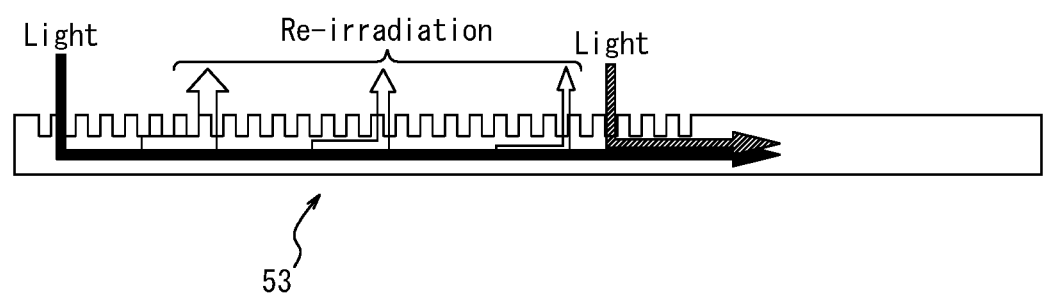
FIG. 17B is a view of a cross-section, taken along line C-C in FIG. 17A, in a state in which a portion of the light received by the diffraction grating is re-irradiated.

We discovered that forming one diffraction grating 53 to be larger than the light-emitting surface EF of the light-emitting element, as illustrated in FIG. 17A, does not allow highly efficient coupling with the light-emitting element. We also discovered that the light received at the distal portion of the diffraction grating 53, opposite the side connected to the light propagation unit, does not all propagate to the connection side of the diffraction grating 53, as illustrated in FIG. 17B. Rather, a portion of this light is re-irradiated from inside the diffraction grating to the outside of the core layer at the middle section of the diffraction grating 53. Furthermore, we discovered that since such re-irradiation occurs, the light-emitting element and the diffraction grating can be coupled highly efficiently by forming a plurality of diffraction gratings that are smaller than the light-emitting surface of the light-emitting element instead of forming one diffraction grating that is equivalent in size to the light-emitting surface of the light-emitting element.

Accordingly, as a result of the first diffraction grating unit having a plurality of first diffraction gratings, and at least two first diffraction gratings among the plurality of first diffraction gratings being positioned to receive light emitted from the same light-emitting surface of the light source, the present embodiment can suppress the aforementioned negative effect occurring when one diffraction grating that is larger than the light-emitting surface of the light-emitting element is formed. The present embodiment can also couple the light-emitting element and the optical waveguide with two or more of the first diffraction gratings, thereby achieving highly efficient coupling.

When a portion of the core layer separated from the diffraction grating unit in the thickness direction is the light propagation unit in the present embodiment, the diffraction gratings in the diffraction grating unit can be formed more densely, which enables more efficient coupling of the light-emitting element and the optical waveguide. The reason is that since the diffraction gratings connect to the propagation channels of the light propagation unit, the diffraction gratings need to be formed while avoiding the propagation channels when the diffraction grating unit includes a plurality of diffraction gratings and the light propagation unit is not separated from the diffraction grating unit in the thickness direction. By contrast, if the light propagation unit is separated from the diffraction grating unit in the thickness direction as in the present embodiment, then one diffraction grating can be arranged near another diffraction grating connected to the propagation channel that is separated from the one diffraction grating in the thickness direction. The diffraction gratings can thus be arranged densely regardless of the position where the propagation channels connected to the diffraction gratings are formed.

In the present embodiment, the diffraction grating unit separated from the portion of the core layer in the thickness direction may be either or both of the first diffraction grating unit and the second diffraction grating unit.

When a portion of the core layer separated from the diffraction grating unit in the thickness direction is the light propagation unit in the present embodiment, the plurality of propagation channels of the light propagation unit can be separated from the diffraction gratings of the diffraction grating unit in the thickness direction. This enables the diffraction gratings to be arranged densely when the diffraction grating unit includes a plurality of diffraction gratings.

As described above, when the first diffraction grating unit includes a plurality of first diffraction gratings in the present embodiment, at least two of the first diffraction gratings among the plurality of first diffraction gratings can be positioned to receive light emitted by the same light-emitting surface of the light source. All of the first diffraction gratings, however, may be configured to receive light emitted by the same light-emitting surface of the light source. Stating that at least two first diffraction gratings receive light emitted by the same light-emitting surface of the light source refers to that, in plan view (as viewed from the surface layer side of the optical waveguide in the thickness direction), at least two first diffraction gratings among the plurality of first diffraction gratings are located within a range yielded by projecting the range considered to be the same light-emitting surface of the light source onto the first diffraction grating unit in a direction orthogonal to the light-emitting surface. Even if the at least two first diffraction gratings are not entirely located within this range, it suffices for the below-described intake unit (uneven portion) of the first diffraction gratings to be located within this range. The range considered to be the same light-emitting surface is not necessarily limited to one light-emitting surface. In the case of a plurality of light-emitting surfaces, the total range of the plurality of light-emitting surfaces is considered one light-emitting surface when the light outputted from each light-emitting surface is synchronously controlled by a common drive system. Furthermore, light emitted from each point within the same light-emitting surface may have an equivalent wavelength dispersion. In other words, light in the same wavelength band may be emitted from each point within the same light-emitting surface. The light-emitting surface of the light source is the portion of the surface, from which light is emitted, that can come into contact with the gas or liquid to be measured.

In the present embodiment, the first diffraction grating may include a light intake unit that takes light from the outside into the core layer, and the second diffraction grating may include a light extraction unit that extracts light to outside the core layer. In the present embodiment, the light intake unit and light extraction unit may be portions where an unevenness is formed on the surface over a particular period (or a plurality of periods). Alternatively, in a cross-sectional view of the optical waveguide including a plane having recessed portions and protruding portions, the recessed portions of the unevenness may become deep grooves, separating the core layer. In this configuration, the protruding portions are formed discontinuously.

The light intake unit and light extraction unit can be provided so that, in plan view, unevenness is formed in parallel patterns extending as a line or an ark, but the unevenness may extend in any shape.

The diffraction grating may have any shape in plan view in the present embodiment. For example, the shape may have a portion that widens from the connection side to the distal side, with the tip being the apex of the first diffraction grating and the second diffraction grating on the side connected to the light propagation unit. Specifically, while the shape also depends on the light intake unit and the light extraction unit of the first diffraction grating and the second diffraction grating, the shape may be a fan centered on the apex of the first diffraction grating and the second diffraction grating, a triangle centered on the apex of the first diffraction grating and the second diffraction grating (such as an isosceles triangle), or a shape with a first portion having the apex as the tip and widening from the apex towards the intake unit or the extraction unit and a second portion with an arbitrary shape, such as a rectangle, continuous with this first portion. The shape of the diffraction grating preferably has line symmetry relative to a virtual line from the connection side towards the distal side and preferably has a shape that does not decrease in width from the apex towards the intake unit or the extraction unit.

The side of the first diffraction grating and the second diffraction grating connected to the light propagation unit is also referred to as the connection side of the diffraction grating, and the distal side of the first diffraction grating and the second diffraction grating opposite the side connected to the light propagation unit is also referred to as the distal side of the diffraction grating.

In the present embodiment, at least one first diffraction grating among the plurality of first diffraction gratings can have a maximum diffraction grating length of $20\lambda$ or less, preferably $10\lambda$ or less, more preferably $5\lambda$ or less. The light-emitting element and the optical waveguide can be coupled more efficiently by the maximum diffraction grating length of at least one first diffraction grating being $20\lambda$ or less. The aforementioned $\lambda$ represents the average wavelength, in a vacuum, of the light propagating through the core layer.

Specifically, in a diffraction grating that is larger than the light-emitting surface of the light-emitting element, for example, a portion of the light that is received at the distal side opposite the side where the diffraction grating is connected to the light propagation unit is re-irradiated to the outside of the core layer from within the diffraction grating. After extensively researching this phenomenon, we discovered that this re-irradiation is based on the principle that wavelength selectivity in the diffraction grating improves as the diffraction grating length is greater. In other words, if the diffraction grating length is too long, a more singular wavelength is selected, and even light that slightly differs from the selected wavelength ends up being re-irradiated outside the core layer. The selected wavelength band thus grows narrower as the diffraction grating length is longer, approaching a line spectrum. Based on these findings, we discovered that setting the maximum diffraction grating length to 20λ or less for the first diffraction grating allows selection of an effective wavelength band for the optical density measuring apparatus. In an optical density measuring apparatus that can use the optical waveguide of the present embodiment, density is measured using the absorption of light by the substance to be measured. The light absorption wavelength range of a substance has a certain width, however, and is not strictly a single wavelength. For example, a representative absorption wavelength of $CO_2$, which is a gas floating in the environment, is distributed over a relatively wide range of approximately 4.20 μm to 4.35 μm. In other words, if light is excessively selected to the point of a strictly single wavelength, a wavelength region effective for density measurement is wasted. This is not preferable for an optical density measuring apparatus. Hence, setting the maximum diffraction grating length of at least one first diffraction grating among the plurality of first diffraction gratings in the present embodiment to 20λ or less can suppress unnecessary re-irradiation of light introduced to the diffraction grating (excessive wavelength selection), and as an optical waveguide, can further increase the efficiency of coupling between the light-emitting element and the optical waveguide.

The maximum diffraction grating length of at least one first diffraction grating is preferably 10λ or less, more preferably 5λ or less. When measuring the density of $CO_2$, for example, which is a gas floating in the environment, the adoption of these ranges can suppress unnecessary re-irradiation (excessive wavelength selection) while selecting a wavelength band useful for the optical density measuring apparatus. As an optical waveguide used in an optical density measuring apparatus, the efficiency of coupling between the light-emitting element and the optical waveguide can thereby be further increased.

Here, the diffraction grating length of the first diffraction grating is measured starting at a specific point in the extending direction of the wall, among the walls dividing the recessed portions or protruding portions of the intake unit of the above-described first diffraction grating, that is positioned closest to the connection side to the light propagation unit. The diffraction grating length indicates the length from this starting point towards the distal side, along a virtual line extending in a direction orthogonal to the extending direction of the wall from the specific point, to the wall positioned closest to the distal side along the virtual line (the wall, among the walls dividing the recessed portions or protruding portions of the intake unit, that is positioned closest to the distal side). The diffraction grating length of the first diffraction grating can change depending on the shape of the intake unit of the first diffraction grating. That is, the length from the aforementioned starting point can change depending on the shape of the intake unit. The maximum diffraction grating length of the first diffraction grating indicates the longest length among the aforementioned diffraction grating lengths.

The minimum diffraction grating length of the first diffraction grating in the present embodiment is preferably 1λ or more. The diffraction grating length of 1λ is the minimum necessary distance for selecting a particular wavelength band with respect to the light emitted by the light source.

The at least one first diffraction grating, among the plurality of first diffraction gratings, that has the maximum diffraction grating length of 20λ or less is preferably positioned within the range yielded by projecting the range of the light-emitting surface of the light source. The at least one first diffraction grating that has the minimum diffraction grating length of 1λ or more is also preferably positioned within the range yielded by projecting the range of the light-emitting surface of the light source.

The number of first diffraction gratings in the first diffraction grating unit in the present embodiment can be 4 or more, preferably 8 or more, more preferably 16 or more. The light-emitting element and the optical waveguide can thereby be coupled more efficiently.

The first diffraction gratings in the first diffraction grating unit can be arranged periodically in plan view in the present embodiment. The plurality of first diffraction gratings may, for example, be periodically arranged to face in alternate directions. The arrangement of the first diffraction gratings in the first diffraction grating unit in plan view may be expressed as one of the space groups p2, p2mm, p2mg, p2gg, and c2mm. This arrangement allows the area to be used efficiently.

Furthermore, at least two first diffraction gratings among the plurality of first diffraction gratings in the first diffraction grating unit can be connected to the light propagation unit in opposite directions in plan view of the optical waveguide. Specifically, at least two first diffraction gratings are connected to the light propagation unit in the horizontal direction, or the vertical direction, in plan view of the plurality of first diffraction gratings. In other words, the connection directions of at least two first diffraction gratings to the light propagation unit are 180 degrees apart. The arrangement of the first diffraction gratings in the first diffraction grating unit in plan view of the optical waveguide may be expressed as one of the space groups p1, pm, pg, cm in addition to one of the space groups p2, p2mm, p2mg, p2gg, and c2mm. This arrangement allows the area to be used efficiently.

In the present embodiment, the structure of the second diffraction grating unit may be identical to the structure of the first diffraction grating unit or a modification to the structure of the first diffraction grating unit. A modification to the structure of the first diffraction grating unit refers to the shape, configuration, arrangement, and the like, of the second diffraction gratings included in the second diffraction grating unit being a form with rotation, enlargement, reduction, translation, line symmetry, or point symmetry relative to the shape, configuration, arrangement, and the like, of the first diffraction gratings included in the first diffraction grating unit. A difference of 1λ or less, preferably 1 μm or less, between these structures is tolerated. When the structure of the second diffraction grating unit is the same as the structure of the first diffraction grating unit or a modification to the structure of the first diffraction grating unit, the wavelength selectivity in the first diffraction grating unit and the wavelength selectivity in the second diffraction grating unit can be made substantially equivalent. This can avoid light loss occurring when the wavelength selectivities differ between the first diffraction grating unit and the second diffraction grating unit.

Substrate

The substrate in the present embodiment may be any substrate on which the core layer can be formed. The below-described support can also be formed on the substrate. Specific examples of the substrate include a silicon substrate and a GaAs substrate.

Support

Any support may be provided in the present embodiment. The support connects at least a portion of the substrate and at least a portion of the core layer. The support may be any material capable of joining the substrate and the core layer but is preferably a material that has a smaller refractive index than the core layer with respect to light of any wavelength or light propagating through the core layer. Examples of the material forming the support include $SiO_2$. The support is not an essential element in the present disclosure. The core layer may be joined to the substrate by the support, or the core layer may be formed directly on the substrate. The support may be discontinuous, and at least a portion of the core layer may be floating, without being joined to the support. In other words, a space is formed between the substrate and the core layer except in a region where the support is provided in an optical waveguide configured in this way. The extent of the interaction between the evanescent wave and the substance to be measured can be increased by causing a portion of the core layer to be free-standing. This can increase sensor sensitivity.

An example of a method of forming the support in the present embodiment is to etch a buried oxide (BOX) layer ($SiO_2$ layer) of a silicon on insulator (SOI) substrate, thereby forming a structure in which the BOX layer supports the core layer (Si layer) with respect to the substrate (Si layer).

Light Source

The light source may be any light source capable of causing light to enter the core layer. An incandescent bulb, a ceramic heater, a micro electro mechanical systems (MEMS) heater, an infrared light emitting diode (LED), or the like can be used as the light source in the case of using infrared radiation to measure a gas. In other words, an incoherent light source may be used. The light source may be arranged in any way that allows optical connection. For example, the light source may be arranged adjacent to the optical waveguide in the same body as the optical waveguide or may be arranged in a separate body that is a certain distance from the optical waveguide. A mercury lamp, an ultraviolet LED, or the like can be used as the light source in the case of using ultraviolet rays to measure a gas.

The light propagating through the core layer of the optical waveguide provided in the optical density measuring apparatus may be infrared radiation serving as an analog signal. Infrared radiation serving as an analog signal does not refer to determining the change in the energy of light to be one of two values, i.e. 0 (low level) or 1 (high level), but rather to a signal that carries the amount of change in the energy of light. The optical density measuring apparatus can therefore be applied to sensors or to analysis apparatuses. In this case, the wavelength of the infrared radiation in a vacuum may be from 2 µm or more to less than 12 µm. This is a wavelength band absorbed by gases ($CO_2$, $CO$, $NO$, $N_2O$, $SO_2$, $CH_4$, $H_2O$, $C_2H_6O$, and the like) that are typically floating in the environment. Consequently, the optical density measuring apparatus of the present embodiment can be used as a gas sensor.

The light-emitting surface of the light source in the present embodiment can be disposed near to and facing the first diffraction grating unit (in other words, the first diffraction grating unit can be placed near to and facing the light-emitting surface of the light source). In this way, the proportion of the light that reaches the first diffraction grating unit from the light emitted from the light source towards the first diffraction grating unit can be increased (when viewing the first diffraction grating unit from the light source, the solid angle created by the first diffraction grating unit widens). Light can therefore be introduced efficiently into the optical waveguide.

"Near" refers to a length that is 1 mm or less, or $\sqrt{Ss}$ or less where Ss is the area of the same light-emitting surface of the light source. This length is preferably 500 µm or less, or $0.5\times\sqrt{Ss}$ or less, and is more preferably 200 µm or less, or $0.2\times\sqrt{Ss}$ or less. This length refers to the length measured in the thickness direction of the optical waveguide from the bottom edge of the light-emitting surface of the light source on the optical waveguide side to the first diffraction grating unit positioned closest to the light source. Other members, such as a lens or optical fiber, are preferably not present between the light-emitting surface of the light source and the first diffraction grating unit, and the light outputted from the light-emitting surface preferably reaches the first diffraction grating unit directly after passing through a slight space. This allows the optical density measuring apparatus to be produced at a low cost.

The ratio of the total area of the first diffraction gratings covered by the light-emitting surface of the light source to the area of the light-emitting surface may be 60% or more in the present embodiment. This enables the light-emitting element and the optical waveguide to be coupled highly efficiently.

This ratio is preferably 80% or higher. This enables the light-emitting element and the optical waveguide to be coupled even more efficiently.

The area of the first diffraction gratings covered by the light-emitting surface refers to the area of the intake unit of the first diffraction gratings located in the range yielded by projecting the range considered to be the same light-emitting surface of the light source onto the first diffraction grating unit along a direction orthogonal to the light-emitting surface.

Detector

The detector may be any detector capable of detecting light that has propagated through the core layer of the optical waveguide. A thermal infrared sensor such as a pyroelectric sensor, a thermopile, or a bolometer; a quantum infrared sensor such as a diode or a phototransistor; or the like can be used as the detector in the case of using infrared radiation to measure a gas. A quantum ultraviolet sensor, such as a diode or a phototransistor, or the like can be used as the detector in the case of using ultraviolet rays to measure a gas.

The detector in the present embodiment can be disposed near to and facing the second diffraction grating unit (in other words, the second diffraction grating unit can be placed near to and facing the detector). In this way, the proportion of the light that reaches the detector from the light outputted from the second diffraction grating unit towards the detector can be increased (when viewing the detector from the second diffraction grating unit, the solid angle created by the detector widens). Light can therefore be introduced efficiently into the detector.

"Near" refers to a length that is 1 mm or less, or $\sqrt{Sd}$ or less where Sd is the area of the light-receiving surface of the detector. This length is preferably 500 µm or less, or 0.5×√Sd or less, and is more preferably 200 μm or less, or 0.2×√Sd or less. This length refers to the length measured in the thickness direction of the optical waveguide from the bottom edge of the detector on the optical waveguide side to the second diffraction grating unit positioned closest to the detector. Other members, such as a lens or optical fiber, are preferably not present between the second diffraction grating unit and the detector, and the light outputted from the second diffraction grating unit preferably reaches the detector directly after passing through a slight space. This allows the optical density measuring apparatus to be produced at a low cost.

Optical Density Measuring Apparatus According to an Embodiment of the Present Disclosure An optical density measuring apparatus according to an embodiment of the present disclosure is described with reference to FIG. 1.

An optical density measuring apparatus 14 of the present embodiment includes an optical waveguide 15 of the present embodiment, described below, a light source 17 capable of irradiating light into a core layer 12, and a light detector (example of the detector) 18 capable of receiving light propagated through the core layer 12. The optical density measuring apparatus 14 further includes a second diffraction grating unit 13 that takes in light from a light propagation unit 10 and outputs the light to the light detector 18.

In greater detail, the optical density measuring apparatus 14 of the present embodiment is obtained by first manufacturing the below-described optical waveguide 15 according to an embodiment of the present disclosure. Subsequently, the light source 17 is installed to be capable of irradiating infrared radiation IR onto one diffraction grating unit 11 (grating coupler) of the optical waveguide 15, and the light detector 18 is disposed to be capable of receiving the infrared radiation IR emitted from the other diffraction grating unit 13 (grating coupler) of the optical waveguide 15, as illustrated in FIG. 1.

In the optical density measuring apparatus 14 of the present embodiment, the first diffraction grating unit 11 is disposed near to and facing the light-emitting surface of the light source 17. Specifically, the length measured in the thickness direction of the optical waveguide 15 from the bottom edge of the light-emitting surface of the light source 17 on the optical waveguide side to the first diffraction grating unit 11 positioned closest to the light source 17 is 1 mm or less, or √Ss or less where Ss is the area of the same light-emitting surface of the light source 17. This length is preferably 500 μm or less, or 0.5×√Ss or less, and is more preferably 200 μm or less, or 0.2×√Ss or less. When this length is thus 1 mm or less, or √Ss or less, the proportion of the light that reaches the first diffraction grating unit 11 from the light emitted from the light source 17 towards the first diffraction grating unit 11 can be increased (when viewing the first diffraction grating unit 11 from the light source 17, the solid angle created by the first diffraction grating unit 11 widens). Light can therefore be introduced efficiently into the optical waveguide 15.

For these reasons, no lower limit is placed on the aforementioned length, and the light-emitting surface of the light source 17 may be in contact with the first diffraction grating unit 11. To appropriately manufacture the optical density measuring apparatus 14, however, the aforementioned length is preferably 3 μm or more. A lens or optical fiber is not present between the light-emitting surface of the light source 17 and the first diffraction grating unit 11, and the light outputted from the light-emitting surface reaches the first diffraction grating unit 11 directly after passing through a slight space of the aforementioned length. This allows the optical density measuring apparatus to be produced at a low cost.

The aforementioned length of the near arrangement is now described in detail. The results of numerically calculating the proportion of arriving light when the aforementioned length was changed in an optical simulation are indicated in FIG. 15 to illustrate the aforementioned appropriate length. FIG. 15 indicates the proportion of light that reaches the first diffraction grating unit among light emitted from the same light-emitting surface of the light source as a function of D/A, where the shape of the same light-emitting surface of a Lambertian light source is assumed to be a square with sides of length A (i.e. the area of the same light-emitting surface is $A^2$), and the aforementioned length is D. The area of the first diffraction grating unit that receives light emitted by the light source is assumed to be the same as the area of the same light-emitting surface of the light source. As illustrated in FIG. 15, the proportion of light reaching the first diffraction grating unit is approximated by the inverse square of the length D in the region where D/A>1 (i.e. when the light source is placed far away, so that D>A). The reason is that at longer distances, the projected area created by light traveling the distance up to the first diffraction grating unit increases in size proportionally to the square of the length D, and the irradiance into the first diffraction grating unit accordingly diminishes. Conversely, in the region where D/A<1 (i.e. when the light source is placed nearby, so that D<A), the proportion of the arriving light is maximized and tends toward saturation as D/A grow smaller. In other words, light can be introduced to the optical waveguide 15 efficiently by setting the length D to be A (the square root of the area of the same light-emitting surface) or less, preferably 0.5 A or less, more preferably 0.2 A or less. This principle similarly holds for the second diffraction grating unit and the light-receiving surface of the light detector, described below. In this case, the area of the second diffraction grating corresponds to the above-described area of the same light-emitting surface of the light source, and the area of the light-receiving surface of the light detector corresponds to the above-described area of the first diffraction grating unit. The area of the same light-emitting surface of the light source and the area of the light-receiving surface of the light detector may each be 1 $mm^2$ or more.

In the optical density measuring apparatus 14 of the present embodiment, the second diffraction grating unit 13 is disposed near to and facing the light detector 18. Specifically, the length measured in the thickness direction of the optical waveguide 15 from the bottom edge of the light detector 18 on the optical waveguide side to the second diffraction grating unit 13 positioned closest to the light detector 18 is 1 mm or less, or √Sd or less where Sd is the area of the light-receiving surface of the light detector 18. This length is 500 μm or less, or 0.5×√Sd or less, and is more preferably 200 or less, or 0.2×√Sd or less. When this length is thus 1 mm or less, or √Sd or less, the proportion of the light that reaches the light detector 18 from the light outputted from the second diffraction grating unit 13 towards the light detector 18 can be increased (when viewing the light detector 18 from the second diffraction grating unit 13, the solid angle created by the light detector 18 widens). Light can therefore be introduced efficiently into the light detector 18.

For these reasons, no lower limit is placed on the aforementioned length, and the light-receiving surface of the light detector 18 may be in contact with the second diffraction grating unit 13. To appropriately manufacture the optical density measuring apparatus 14, however, the aforementioned length is preferably 3 μm or more. A lens or optical fiber is not present between the second diffraction grating unit 13 and the light detector 18, and the light outputted from the second diffraction grating unit 13 reaches the light detector 18 directly after passing through a slight space of the aforementioned length. This allows the optical density measuring apparatus to be produced at a low cost.

In the optical density measuring apparatus 14 of the present embodiment, the ratio of the total area of first diffraction gratings 111 covered by the light-emitting surface of the light source 17 to the area of the light-emitting surface is 60% or more, preferably 80% or more. This enables the light-emitting element and the optical waveguide 15 to be coupled highly efficiently.

The light source 17 in the optical density measuring apparatus 14 of the present embodiment irradiates infrared radiation with a wavelength of 2 μm or more and less than 12 μm into the core layer 12. As a result of this infrared radiation being irradiated into the core layer 12, the evanescent wave EW extending from the core layer 12 is absorbed by a substance to be measured that is present in an exterior space 16, such as $CO_2$, $CO$, $NO$, $N_2O$, $SO_2$, $CH_4$, $H_2O$, $C_2H_6O$, or another gas. The density of the substance to be measured can thus be detected.

Optical Waveguide According to an Embodiment of the Present Disclosure

First Embodiment

An optical waveguide according to a first embodiment of the present disclosure is described with reference to FIGS. 1 through 5.

FIG. 1 illustrates the schematic configuration of an optical density measuring apparatus 14 according to the present embodiment and is also a conceptual drawing of the ATR method using the optical waveguide 15 according to the first embodiment. As illustrated in FIG. 1, the optical density measuring apparatus 14 is installed and used in an exterior space 16 containing a gas whose density or the like is to be detected. The optical density measuring apparatus 14 includes the optical waveguide 15 according to the present embodiment, the light source 17 capable of irradiating light (infrared radiation IR in the present embodiment) into the core layer 12 provided in the optical waveguide 15, and a light detector (an example of a detector) 18 capable of receiving the infrared radiation IR that has propagated through the core layer 12.

The optical waveguide 15 includes a substrate 19, the core layer 12 through which the infrared radiation IR (an example of light) can propagate, and a support 20 configured to connect at least a portion of the substrate 19 with at least a portion of the core layer 12 and support the core layer 12 with respect to the substrate 19. The core layer 12 and the substrate 19 are, for example, formed from silicon (Si), and the support 20 is, for example, formed from silicon dioxide ($SiO_2$). The substrate 19 and the support 20 are, for example, plate-shaped. The support 20 may support the entire core layer 12, as illustrated in FIG. 1, or may support at least a portion of the core layer 12. For example, the support 20 can be configured to support the entire diffraction grating unit and to support a portion of the light propagation unit 10 discontinuously in the extending direction (in the resulting optical waveguide 15, the light propagation unit 10 is connected to the support 20 discontinuously in the extending direction, and a gap without a predetermined layer, such as a cladding layer, is present between the light propagation unit 10 and the substrate 19, except in the regions where the support 20 is provided).

The core layer 12 includes the first diffraction grating unit (for example, a grating coupler) 11 formed at one end in the extending direction and the second diffraction grating unit (for example, a grating coupler) 13 formed at the other end. The core layer 12 includes the light propagation unit 10 between the first diffraction grating unit 11 and the second diffraction grating unit 13 located at the ends in the extending direction. The film thickness of the light propagation unit 10 in the optical waveguide 15 according to the present embodiment is uniform. The width of the light propagation unit 10 in the optical waveguide 15 according to the present embodiment is also uniform. The width direction is the direction perpendicular to the extending direction and the film thickness direction. The film thickness direction is the direction parallel to the stacking direction in which the substrate 19, support 20, and core layer 12 are stacked.

The first diffraction grating unit 11 is disposed in the emission direction of the light source 17. In the present embodiment, the optical waveguide 15 is arranged so that the stacking direction thereof is parallel to the vertical direction, and the principal surface of the substrate 19 is in a direction orthogonal to the vertically downward. The principal surface of the substrate 19 is a surface perpendicular to the thickness direction of the substrate 19 and refers, in the present embodiment, to the surface with the largest area among the six surfaces forming the substrate 19. In other words, the emission direction of the light source 17 is the vertically downward direction from the light source 17 when the optical waveguide 15 is installed in this manner. This diffraction grating unit is configured to couple the infrared radiation IR introduced from the light source 17 to the core layer 12. Accordingly, the light that propagates through the core layer 12 is inputted from the film thickness direction of the first diffraction grating unit 11. The second diffraction grating unit 13 is disposed in the direction facing the light detector 18. The direction facing the light detector 18 is the vertically downward direction from the light detector 18 when the optical waveguide 15 is installed in this manner. This diffraction grating unit extracts the infrared radiation IR propagating through the core layer 12 and emits the infrared radiation IR towards the light detector 18. Accordingly, the light that propagates through the core layer 12 is outputted in the film thickness direction of the second diffraction grating unit 13.

In this way, one end of the core layer 12 disposed at the light source 17 side (light introduction side) includes the first diffraction grating unit 11, and the other end of the core layer 12 disposed at the light detector 18 side (light emission side) includes the second diffraction grating unit 13. Between the center of the core layer 12 in the extending direction and the two ends is the light propagating unit 10 through which the infrared radiation IR introduced from the first diffraction grating unit 11 and emitted from the second diffraction grating unit 13 propagates. The evanescent wave EW extending from the core layer 12 is mainly absorbed by the substance to be measured present in the exterior space 16 at the light propagation unit 10.

The optical waveguide 15 in the first embodiment is now described in greater detail. As illustrated in FIG. 1, a sensor using the ATR method can improve the sensitivity of the sensor by expanding the region of interaction between the evanescent wave EW extending from the core layer 12 and the substance to be measured (i.e. by expanding the exposed portion of the core layer 12). Furthermore, in a sensor using the ATR method, the light introduced into the core layer needs to extend as an evanescent wave from a light propagation unit between the diffraction gratings and be absorbed by the external substance to be measured, as described above. A long propagation distance of light in the light propagation unit (propagation channel) is therefore required. The diffraction grating for input and output of light also needs to have a large size corresponding to the size of the light source and the photodetector. The overall size of the optical waveguide used in the optical density measuring apparatus is therefore a relatively large area. Demand exists for an increase in the degree of design freedom of the core layer, such as the diffraction grating and the light propagation unit, and for efficient placement of each element on the substrate forming the optical waveguide in such a sensor.

In the optical waveguide 15 of the first embodiment, a portion of the core layer 12 is separated in the thickness direction of the optical waveguide from the diffraction grating units 11, 13 to be closer to the substrate in the thickness direction than the diffraction grating units 11, 13, as in the examples illustrated in FIGS. 2, 3A, and 3B.

Specifically, in the illustrated examples, a propagation channel 103 of the light propagation unit 10, which is a portion of the core layer 12, is separated in the thickness direction from the diffraction grating 111 of the first diffraction grating unit 11 to be closer to the substrate in the thickness direction than the diffraction grating 111 (with the same holding for the second diffraction grating unit 13), as illustrated in FIG. 3B, which is a cross-sectional view illustrating an enlargement a portion of the first diffraction grating unit and the propagation channel.

This configuration allows the diffraction grating unit to be disposed freely with respect to a portion of the core layer, thereby increasing the degree of design freedom of the optical waveguide and the optical density measuring apparatus using the optical waveguide.

A separation distance CL measured along the thickness direction between the diffraction grating unit and the portion of the core layer separated from the diffraction grating unit preferably satisfies Expression (1) or (2) below in the first embodiment.

$$CL \geq \frac{3\lambda}{2\pi\sqrt{n_{core}^2 - n_{clad}^2}} \quad (1)$$

In Expression (1), $\lambda$ represents the average wavelength of light in a vacuum, $n_{core}$ represents the refractive index of the material forming the portion of the core layer, and $n_{clad}$ represents the refractive index of the material located in a separation portion between the diffraction grating unit and the portion of the core layer separated from the diffraction grating unit.

$$CL \geq \left(\frac{1}{2}\ln\frac{\lambda L_{Gr}}{\pi n_{core}d^2}\right)\frac{\lambda}{2\pi\sqrt{n_{core}^2 - n_{clad}^2}} \quad (2)$$

In Expression (2), $\lambda$ represents the average wavelength of light in a vacuum, $n_{core}$ represents the refractive index of a material forming the portion of the core layer, $n_{clad}$ represents the refractive index of the material located in a separation portion between the diffraction grating unit and the portion of the core layer separated from the diffraction grating unit, d represents a minimum film thickness of the portion of the core layer, and $L_{Gr}$ is the sum of the diffraction grating length of the diffraction grating unit separated from the portion of the core layer in the thickness direction.

The separation distance CL is preferably 0.7 μm or more and more preferably 1.0 μm or more. In this way, even if the light propagating through the portion of the core layer extends as an evanescent wave, propagation to the diffraction grating unit 11 can be suppressed (the dashed arrow in FIG. 3B can be suppressed) by the separation distance CL being set to the aforementioned predetermined length. The loss of light can therefore be prevented, improving sensitivity of the sensor.

Furthermore, the portion of the core layer separated from the diffraction grating unit preferably has a thickness of 0.3 μm or more, more preferably 0.5 μm or more, at a position separated from the diffraction grating unit in the thickness direction. By the thickness being set in this way, less of the light propagating through the portion of the core layer extends as an evanescent wave, and propagation of light to the diffraction grating unit can be suppressed. The loss of light can therefore be prevented, improving sensitivity of the sensor.

In the first embodiment, any material (including the case of air) with a refractive index relatively lower than that of the diffraction grating unit and the core layer may be present between the diffraction grating unit and the portion of the core layer separated from the diffraction grating unit. In the illustrated example, a silicon oxide film ($SiO_2$) is present between the first diffraction grating unit 11 and the portion of the core layer 12 separated from the first diffraction grating unit 11.

In the first embodiment, the portion of the core layer and the diffraction grating unit may be formed from any materials, but the diffraction grating unit and the portion of the core layer are preferably formed from different materials. This allows the optical waveguide to be manufactured more easily. In the illustrated example, the material of the diffraction grating unit is polycrystalline silicon, and the material of the portion of the core layer is monocrystalline silicon.

In the first embodiment, as illustrated in FIG. 2, the first diffraction grating unit 11 includes a plurality of first diffraction gratings 111. At least two first diffraction gratings 111 among the plurality of first diffraction gratings 111 are positioned to receive light emitted from the same light-emitting surface of the light source 17. Specifically, the range R1 in FIG. 2 is a range, in plan view, yielded by projecting the range considered to be the same light-emitting surface within the light-emitting surface of the light source 17 onto the first diffraction grating unit 11 in a direction orthogonal to the light-emitting surface. At least two first diffraction gratings 111 are present within this range R1. As a result, the first diffraction gratings 111 can be formed with a relatively small size, the re-irradiation occurring in the diffraction grating 53 as illustrated in FIG. 17A can be suppressed, and the light-emitting element and the optical waveguide can be coupled highly efficiently.

All of the first diffraction gratings 111 of the first diffraction grating unit 11 are located within the range R1 in the example in FIG. 2, but a first diffraction grating 111 may be located outside of the range R1. Even if the first diffraction grating 111 is located outside of the range R1, or if a portion of the first diffraction grating 11 is outside the range R1, light can be taken into the core layer 12 by the first diffraction grating located outside, or the portion located outside, since light spreads from the light-emitting surface of the light source 17.

When the first diffraction grating unit 11 includes a plurality of first diffraction gratings 111, and the portion of the core layer 12 that is separated in the thickness direction from the first diffraction grating unit 11 to be closer to the substrate in the thickness direction than the first diffraction grating unit 11 is the light propagation unit 10, as described above, then the first diffraction gratings 111 in the first diffraction grating unit 11 can be formed more densely in the first embodiment, which enables more efficient coupling of the light-emitting element and the optical waveguide.

Since the diffraction gratings connect to the propagation channels 103 of the light propagation unit 10, the diffraction gratings are formed while avoiding the propagation channels in case that the diffraction grating unit includes a plurality of diffraction gratings and the light propagation unit is not located closer to the substrate in the thickness direction than the diffraction grating unit. However, as illustrated in FIG. 3B, which is a cross-sectional view of a portion of the first diffraction grating unit illustrated in FIG. 3A taken along line A-A, if the light propagation unit 10 is separated from the first diffraction grating unit 11 in the thickness direction to be closer to the substrate in the thickness direction than the first diffraction grating unit 11, then one first diffraction grating 111 can be arranged near another first diffraction grating 111 connected to the propagation channel 103 that is located closer to the substrate than the one first diffraction grating 111 in the thickness direction. The first diffraction gratings 111 can thus be arranged densely regardless of the position where the propagation channels 103 connected to the first diffraction gratings 111 are formed.

In the first embodiment, a plurality of propagation channels 103 of the light propagation unit 10 are located closer to the substrate in the thickness direction than the first diffraction gratings 111. Both the first diffraction grating unit 11 and the second diffraction grating unit 13 are separated from a portion of the core layer 12 in the thickness direction.

As illustrated in FIG. 3B, the first diffraction grating 111 and the propagation channel 103 of the light propagation unit 10 are connected using a directional coupler. Specifically, the first diffraction grating 111 includes a connector 111a near the apex 111t on the connection side. The connector 111a is separated from an end 103a of the propagation channel 103 on the first diffraction grating side by a slight distance and extends in parallel while overlapping the end 103a in plan view. The connector 111a and the end 103a of the propagation channel 103 are optically connected (by evanescent coupling) as a result of overlapping over a predetermined length in the extending direction. The light received at the first diffraction grating 111 can thus be guided from the first diffraction grating 111 into the propagation channel 103.

In the optical waveguide 15 of the first embodiment, the light propagation unit 10 of the optical waveguide 15 has at least one linear propagation channel 101, as the propagation channel 103, that takes in the light received by one first diffraction grating 111, propagates the light, and guides the light to one second diffraction grating 131, as illustrated in FIG. 2. This linear propagation channel 101 is linear overall and is shaped so that one second diffraction grating 131 corresponds to one first diffraction grating 111. In this way, the loss of light that would occur upon combining and splitting in the branched propagation channel 102 formed in the second embodiment, described below, can be prevented, and light can be used more efficiently.

All of the propagation channels are linear propagation channels 101 in the illustrated example, but in the present embodiment, it suffices for at least one linear propagation channel 101 to be included. The remaining propagation channels may take any form.

In the example in FIG. 2, the shape of both the first diffraction grating 111 and the second diffraction grating 131 is a fan centered on the apex 111t of the first diffraction grating 111 and the second diffraction grating 131 (FIG. 4A), but the diffraction grating may have any shape in plan view in the present embodiment.

While not limited, the shape may have a portion that widens from the connection side towards the distal side, with the apex 111t of the connection side of the first diffraction grating 111 and the second diffraction grating 131 to the light propagation unit 10 as the tip, for example. That is, apart from the fans centered on the apex 111t (FIGS. 4A, 4B), the shape may be a triangle, such as an isosceles triangle (FIG. 4C), with the apex 111t as the tip, or a shape with a first portion having the apex 111t as the tip and widening from the connection side towards the distal side and a second portion with an arbitrary shape, such as a rectangle, continuous with this first portion (FIG. 4D). The shape of the diffraction grating preferably has line symmetry relative to a virtual line from the connection side towards the distal side and preferably has a shape that does not decrease in width from the apex 111t towards the intake unit or the extraction unit.

Figure 4A:
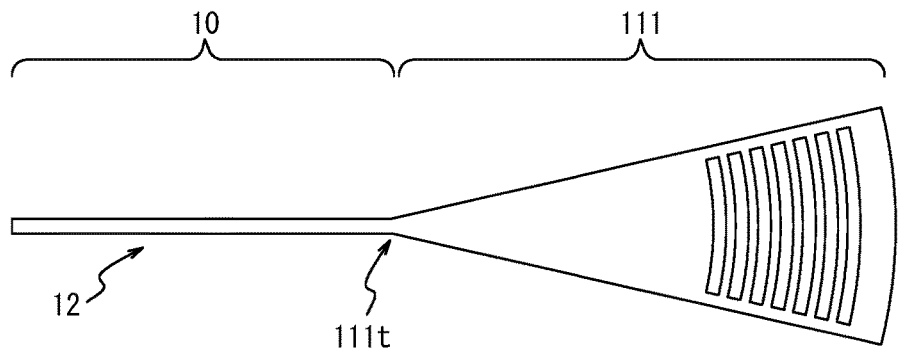
FIGS. 4A to 4D are plan views illustrating example shapes near the diffraction gratings of the optical waveguide in FIG. 1.
Figure 4B:
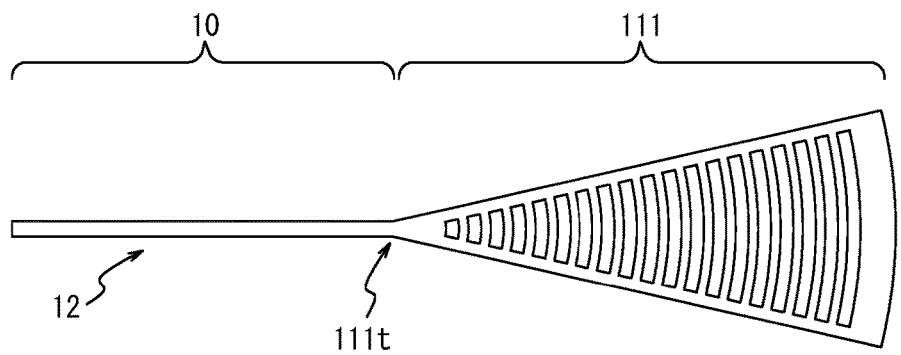
Figure 4C:
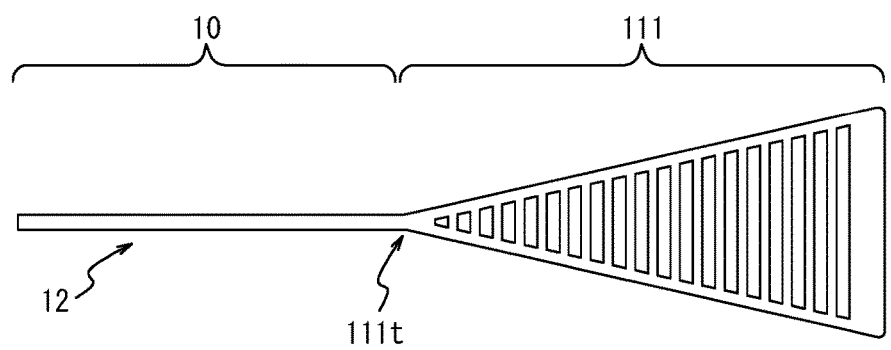
Figure 4D:
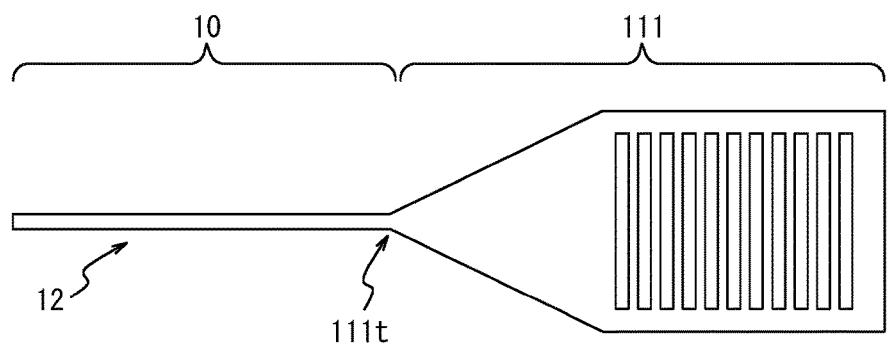

The first diffraction grating 111 may have a portion in which no unevenness is formed in the portion adjacent to the light intake unit on the side connected to the light propagation unit 10, as illustrated in FIGS. 4A and 4D, for example. In other words, the light intake unit need not be formed up to the area near the apex 111t of the diffraction grating as in FIGS. 4B and 4C. This configuration allows an increase in the area of the light intake unit as compared to a diffraction grating of the same diffraction grating length in which the light intake unit is formed up to the area near the apex 111t.

In the first embodiment, at least one first diffraction grating 111 (all in the illustrated example) among the plurality of first diffraction gratings 111 has a maximum diffraction grating length GLM of 20λ or less. The light-emitting element and the optical waveguide 15 can thereby be coupled more efficiently. Here, λ is the average wavelength of the light in a vacuum. Assuming that the gas to be measured is $CO_2$, for example, λ is approximately 4.3 μm.

In the illustrated example, all of the first diffraction gratings 111 of which the maximum diffraction grating length GLM is 20λ or less are located within the range R1, but it is preferable that at least one be located within the range R1. A first diffraction grating 111 of which the maximum diffraction grating length GLM is 20λ or less may be located outside of the range R1.

Figure 5A:
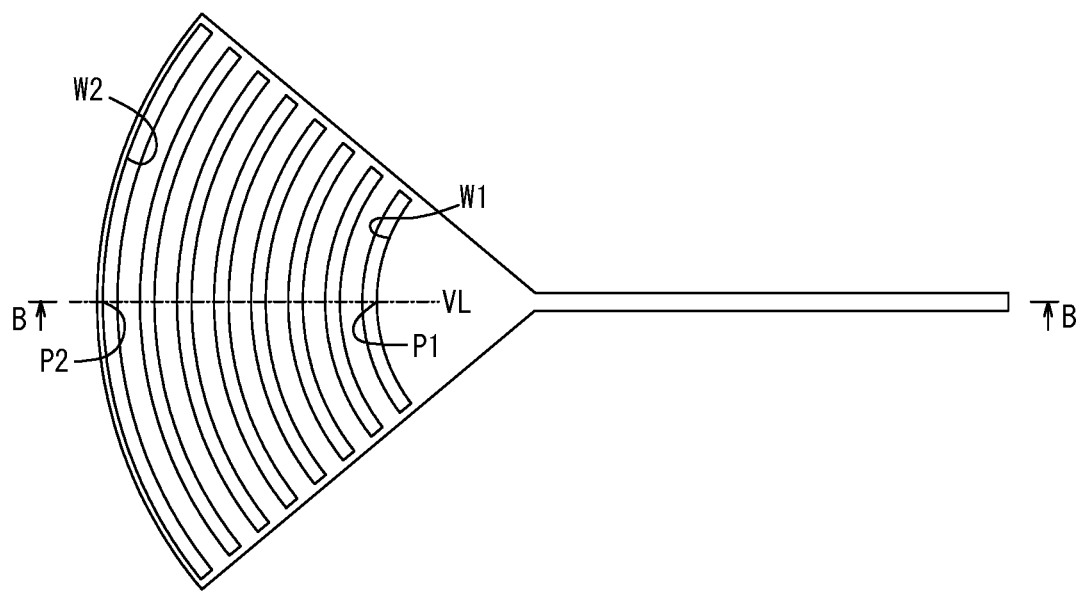
FIG. 5A is a plan view.
Figure 5B:
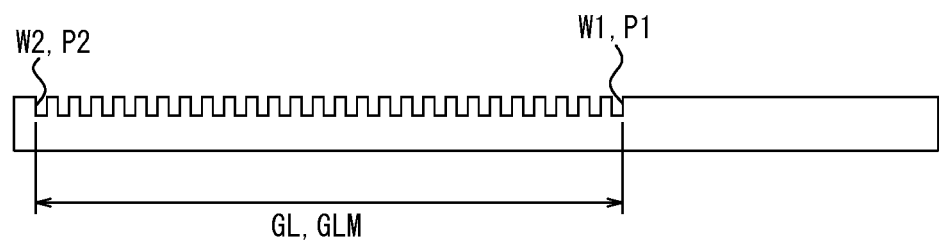
FIG. 5B is a view of a cross-section, taken along line B-B, of the shape near the diffraction grating in FIG. 5A, to illustrate a method of measuring diffraction grating length near the diffraction grating of the optical waveguide in FIG. 1.

The diffraction grating length GL of the first diffraction grating 111 is measured starting at a specific point (such as starting point P1) in the extending direction of the wall W1, among the walls dividing the recessed portions or protruding portions of the intake unit of the above-described first diffraction grating 111, that is positioned closest to the connection side, as illustrated in FIGS. 5A, 5B. The diffraction grating length GL indicates the length from the starting point P1 towards the distal side, along a virtual line VL extending in a direction orthogonal to the extending direction of the wall from the specific point P1, to the wall W2 positioned closest to the distal side along the virtual line VL (the wall, among the walls dividing the recessed portions or protruding portions of the intake unit, that is positioned closest to the distal side). The diffraction grating length GL is thus the length from the starting point P1 on the wall W1 to an ending point P2, on the wall W2, positioned along the virtual line VL. The diffraction grating length GL of the first diffraction grating 111 can change depending on the shape of the intake unit of the first diffraction grating 111. That is, the length from the aforementioned staring point can change depending on the shape of the intake unit. The maximum diffraction grating length GLM of the first diffraction grating 111 indicates the longest length among the aforementioned diffraction grating lengths GL.

The number of first diffraction gratings 111 is fifteen in the example in FIG. 2, but any number may be provided. In the present embodiment, four or more first diffraction gratings 111 in the first diffraction grating unit 11 preferably have a maximum diffraction grating length GLM of 80 μm or less.

In the present embodiment, the first diffraction gratings 111 in the first diffraction grating unit 11 are arranged periodically in alternate directions in plan view. Furthermore, in the present embodiment, at least two first diffraction gratings 111 among the plurality of first diffraction gratings 111 in the first diffraction grating unit 11 are connected to the light propagation unit 10 in opposite directions in plan view of the optical waveguide 15.

Specifically, in the example in FIG. 2, the first diffraction gratings 111 are formed on the surface layer of the optical waveguide 15, and the propagation channels 103 are formed closer to the substrate than the first diffraction gratings 111. As illustrated in FIG. 2, first diffraction gratings 111 that are adjacent in the direction of the axis of the first diffraction grating 111 (along the widthwise center line of the first diffraction grating 111, also referred to below as the diffraction grating axis) form one row while the diffraction grating axes are shifted from each other. Another row of first diffraction gratings 111 adjacent in the horizontal direction of FIG. 2 to the one row of first diffraction gratings 111 is formed to face the opposite direction (the first diffraction gratings 111 of the another row are connected to the light propagation unit 10 in opposite directions to the first diffraction gratings of the one row) so that the first diffraction gratings 111 overall are arranged in alternate directions. The first diffraction gratings 111 are arranged more densely by being formed this way.

In the first embodiment, the first diffraction gratings 111 in the first diffraction grating unit 11 are all the same size and shape, but the first diffraction gratings 111 may have different sizes and shapes. The optical waveguide 15 can be provided with multifunctionality by inclusion of diffraction gratings with different sizes and shapes. An example of multifunctionality is to vary the period of unevenness forming each first diffraction grating 111 to enable selection of many wavelengths.

At least two first diffraction gratings 111 among the plurality of first diffraction gratings 111 in the present embodiment are preferably located in a 5 mm×5 mm range, more preferably a 1 mm×1 mm range, and even more preferably a 500 μm×500 μm range. This enables the light-emitting element and the optical waveguide 15 to be coupled highly efficiently.

In the present embodiment, the ratio of the area of first diffraction gratings 111 is preferably 60% or more in a 5 mm×5 mm range. The ratio of the area of first diffraction gratings 111 is preferably 60% or more in a 1 mm×1 mm range. The ratio of the area of first diffraction gratings 111 is preferably 60% or more in a 500 μm×500 μm range. This enables the light-emitting element and the optical waveguide 15 to be coupled highly efficiently.

In the present embodiment, the second diffraction grating unit 13 may have any structure. Specifically, the structure of the second diffraction grating unit 13 in the illustrated example is the same as the structure of the first diffraction grating unit 11 but may instead be different. A range R2 in FIG. 2 is a range, in plan view of the substrate 19 of the optical waveguide 15 (when looking towards the substrate 19), yielded by projecting the range of the detector onto the second diffraction grating unit 13 in a direction orthogonal to the detection surface of the detector. The size and arrangement of the diffraction gratings in the second diffraction grating unit 13 may, however, be changed in any way depending on the detector, for example.

Next, a method of manufacturing the optical waveguide 15 according to the first embodiment is described with reference to FIGS. 6 through 13. FIGS. 6 through 13 are cross-sections illustrating an example method of manufacturing the section illustrated in FIG. 3B.

In FIGS. 6 through 13, one diffraction grating among the first diffraction grating unit 11 is simplified and illustrated schematically to facilitate the explanation of the method of manufacturing the optical waveguide 15. FIGS. 6 through 13 are cross-sections, taken at a position corresponding to the A-A line in FIG. 3A, illustrating the process of manufacturing the optical waveguide 15.

Figure 6:
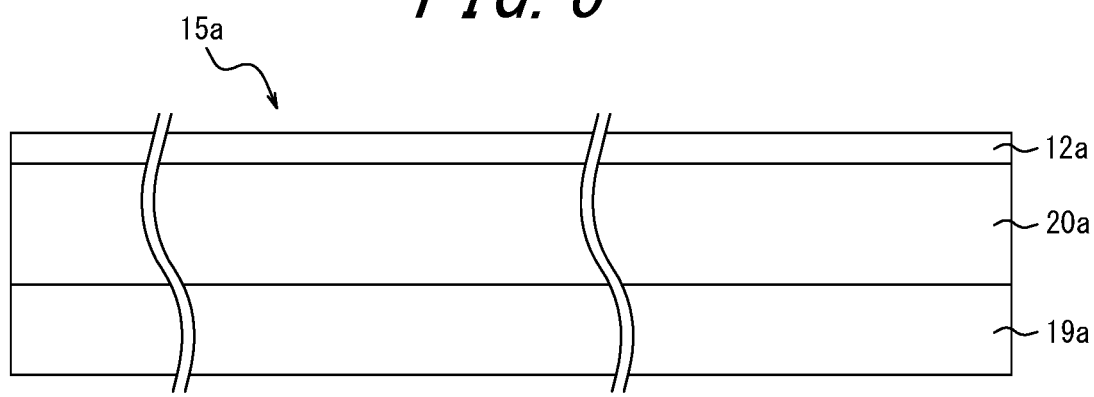
FIG. 6 is a cross-sectional view partially illustrating an optical waveguide main portion to illustrate a method of manufacturing the optical waveguide used in the optical density measuring apparatus according to the first embodiment of the present disclosure.

First, as illustrated in FIG. 6, an $SiO_2$ film is formed on either or both of a support substrate 19a, which is formed from silicon and ultimately becomes the substrate 19, and an active substrate 12a, which is formed from silicon and from which the core layer 12 is formed. The support substrate 19a and the active substrate 12a are then stuck together, with the $SiO_2$ film therebetween, and bonded by thermal process. The active substrate 12a is then ground, polished, or the like to a predetermined thickness to adjust the film thickness of the active substrate 12a. Consequently, an SOI substrate 15a is formed to have a "silicon-insulating layer-silicon" structure that includes the support substrate 19a, a BOX layer 20a formed on the support substrate 19a, and the active substrate 12a formed on the BOX layer 20a.

Figure 7:
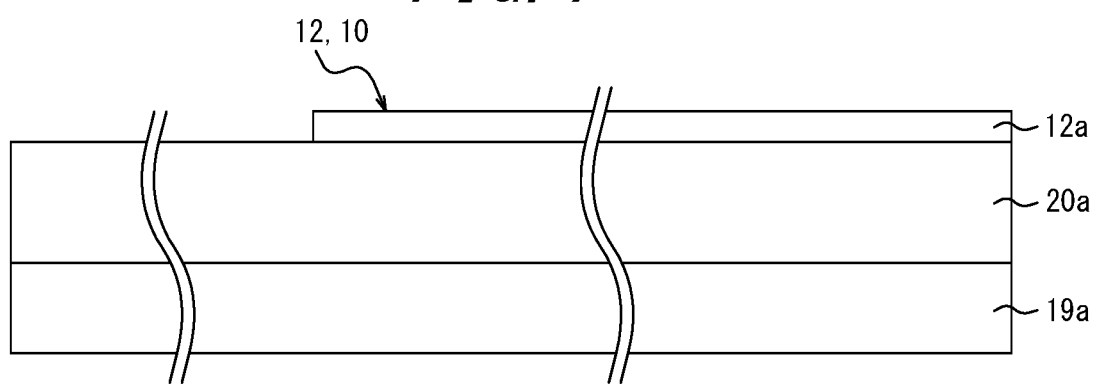
FIG. 7 is a cross-sectional view partially illustrating an optical waveguide main portion to illustrate a method of manufacturing the optical waveguide used in the optical density measuring apparatus according to the first embodiment of the present disclosure.

Next, lithography and etching are used on the SOI substrate 15a to etch the active substrate 12a and form the light propagation unit 10 that includes a portion of the core layer 12. The optical waveguide main portion is thus formed to include the support substrate 19a, the BOX layer 20a formed on the support substrate 19a, and the light propagation unit 10 (which includes a portion of the core layer 12) formed on the BOX layer 20a, as illustrated in FIG. 7.

Figure 8:
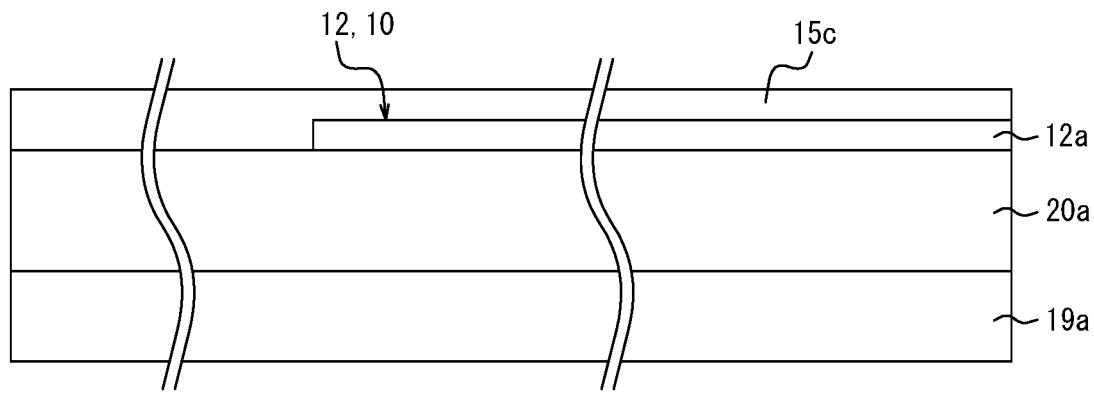
FIG. 8 is a cross-sectional view partially illustrating an optical waveguide main portion to illustrate a method of manufacturing the optical waveguide used in the optical density measuring apparatus according to the first embodiment of the present disclosure.

Next, as illustrated in FIG. 8, a separation film 15c for separating the subsequently formed first diffraction grating 111 and the portion of the core layer 12 is formed by depositing an $SiO_2$ film having tetraethyl orthosilicate (TEOS) as a raw material, for example. After this separation film 15c is formed on the BOX layer 20a and the portion of the core layer 12, the surface is polished by chemical mechanical polishing (CMP) or the like to achieve the structure illustrated in FIG. 8. The portion of the core layer 12 can be separated from the diffraction grating unit 11 in the thickness direction by the separation film 15c.

Figure 9:
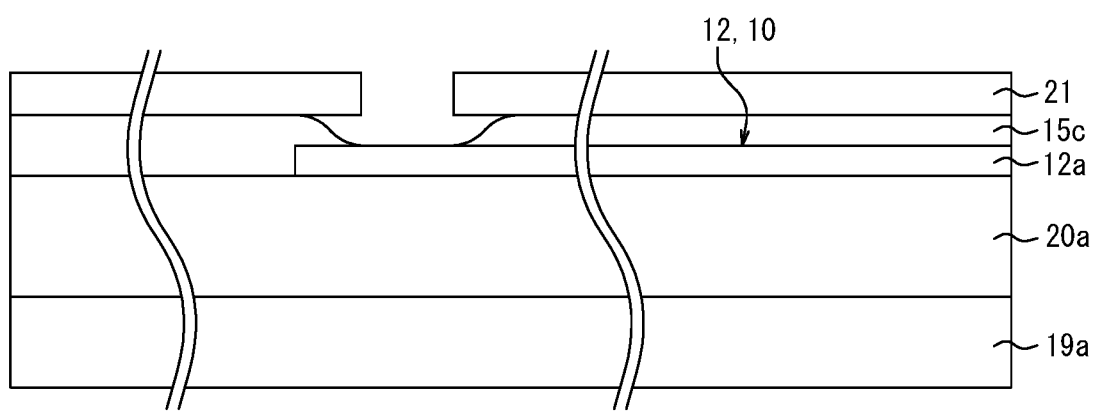
FIG. 9 is a cross-sectional view partially illustrating an optical waveguide main portion to illustrate a method of manufacturing the optical waveguide used in the optical density measuring apparatus according to the first embodiment of the present disclosure.

Next, as illustrated in FIG. 9, a photoresist is patterned on the separation film 15c and used as a mask layer M1 to partially etch the separation film 15c. At this time, buffered hydrofluoric acid (BHF) or the like is used to perform wet etching to form an inclination as gentle as possible. During the wet etching, a gentler inclination can be formed by adjusting the adhesion at the interface between the separation film 15c and the mask layer M1. In this way, a hole is formed in the separation film 15c for optically connecting the subsequently formed connector 111a of the first diffraction grating 111 and the end of the light propagation unit 10 (propagation channel 103), as illustrated in FIG. 9.

Figure 10:
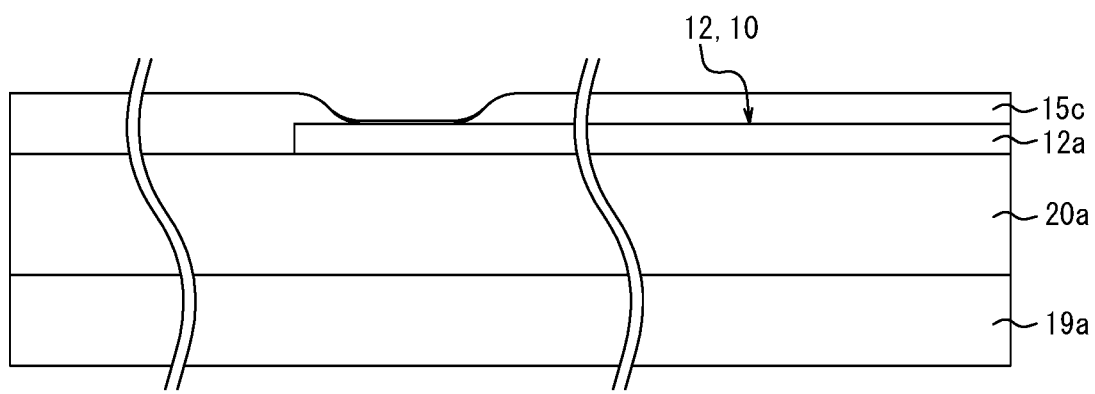
FIG. 10 is a cross-sectional view partially illustrating an optical waveguide main portion to illustrate a method of manufacturing the optical waveguide used in the optical density measuring apparatus according to the first embodiment of the present disclosure.

The mask layer M1 is then removed by etching, and as illustrated in FIG. 10, the exposed surface of the portion of the core layer 12 is oxidized to form a $SiO_2$ film with a thickness of approximately 30 nm, for example. This film is not necessarily formed by oxidation, and may be formed by another method, such as chemical vapor deposition (CVD). Furthermore, this film is not necessarily an $SiO_2$ film and may be a SiN film or the like.

Figure 11:
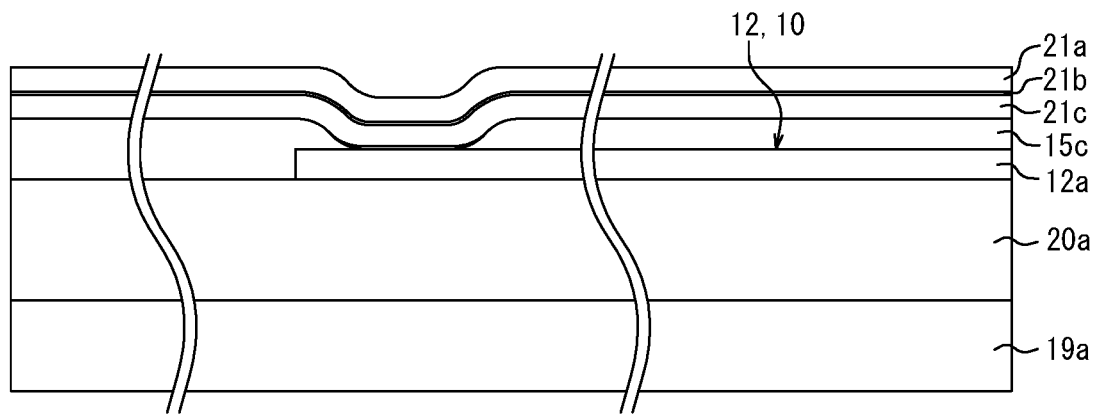
FIG. 11 is a cross-sectional view partially illustrating an optical waveguide main portion to illustrate a method of manufacturing the optical waveguide used in the optical density measuring apparatus according to the first embodiment of the present disclosure.

Next, as illustrated in FIG. 11, a three-layered structure of a polysilicon film (upper layer) 21a/$SiO_2$ film 21b/polysilicon film (lower layer) 21c is formed over the entire surface. The two polysilicon films 21a, 21c are, for example, formed by CVD. The $SiO_2$ film 21b that is the middle layer is formed by oxidation, CVD, or the like. The film thickness of the polysilicon film 21c that is the lower layer is preferably substantially equivalent to the film thickness of the light propagation unit 10 (propagation channel 103). In this case, the first diffraction grating 111 formed from the polysilicon film 21c can be optically connected to the propagation channel 103 in a highly efficient matter. For example, the polysilicon film 21c that is the lower layer and the propagation channel 103 preferably both have a thickness of 0.4 µm.

Figure 12:
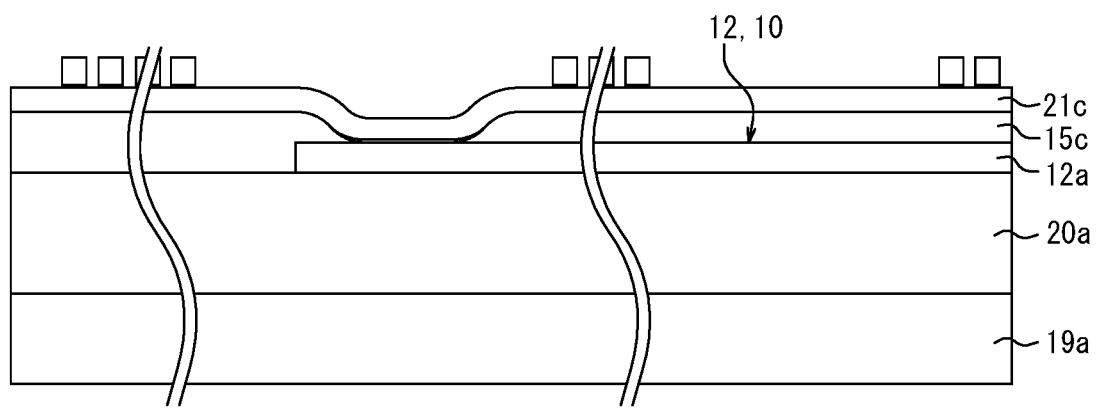
FIG. 12 is a cross-sectional view partially illustrating an optical waveguide main portion to illustrate a method of manufacturing the optical waveguide used in the optical density measuring apparatus according to the first embodiment of the present disclosure.

Next, as illustrated in FIG. 12, lithography and etching are used to etch the polysilicon film 21a that is the upper layer and to form an uneven pattern for forming the diffraction gratings 111. At this time, the $SiO_2$ layer 21b formed between the two polysilicon films 21a, 21c functions as a stopper film during etching. In addition to allowing highly accurate formation of the uneven pattern, this can protect the polysilicon film 21c that is the lower layer from excessive etching. After the uneven pattern is formed, the exposed locations of the $SiO_2$ film 21b used as a stopper layer are removed by dry etching or wet etching.

Figure 13:
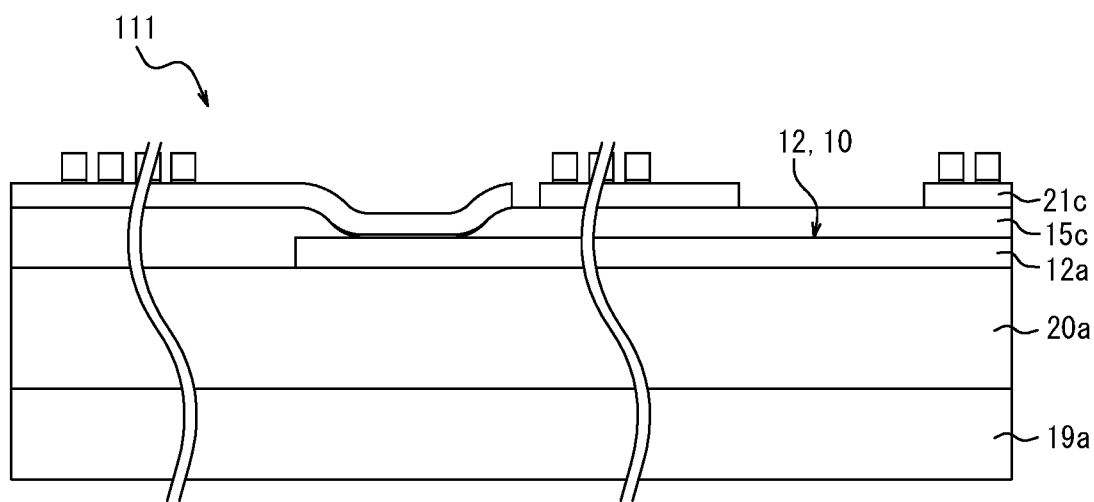
FIG. 13 is a cross-sectional view partially illustrating an optical waveguide main portion to illustrate a method of manufacturing the optical waveguide used in the optical density measuring apparatus according to the first embodiment of the present disclosure.

Next, as illustrated in FIG. 13, lithography and etching are used to etch the polysilicon film 21c that is the lower layer, thereby forming the outline of the first diffraction grating unit 11. Subsequently, while omitted from the drawings, lithography and etching are used to remove a portion of the separation film 15c to expose the surface of a portion of the light propagation unit 10 that performs gas sensing (the portion of the light propagation unit 10 from the first diffraction grating unit 11 to the second diffraction grating unit 13). This yields an optical waveguide main portion 15b with a structure corresponding to the optical waveguide 15 of the first embodiment.

Next, the support substrate 19a is cut in a predetermined region to separate the optical waveguide main portion 15b. The optical waveguide 15 according to the first embodiment is thereby complete.

The above explanation has focused on the first diffraction grating unit 11 as the diffraction grating unit, but the second diffraction grating unit 13 can be formed similarly.

Second Embodiment

Figure 14:
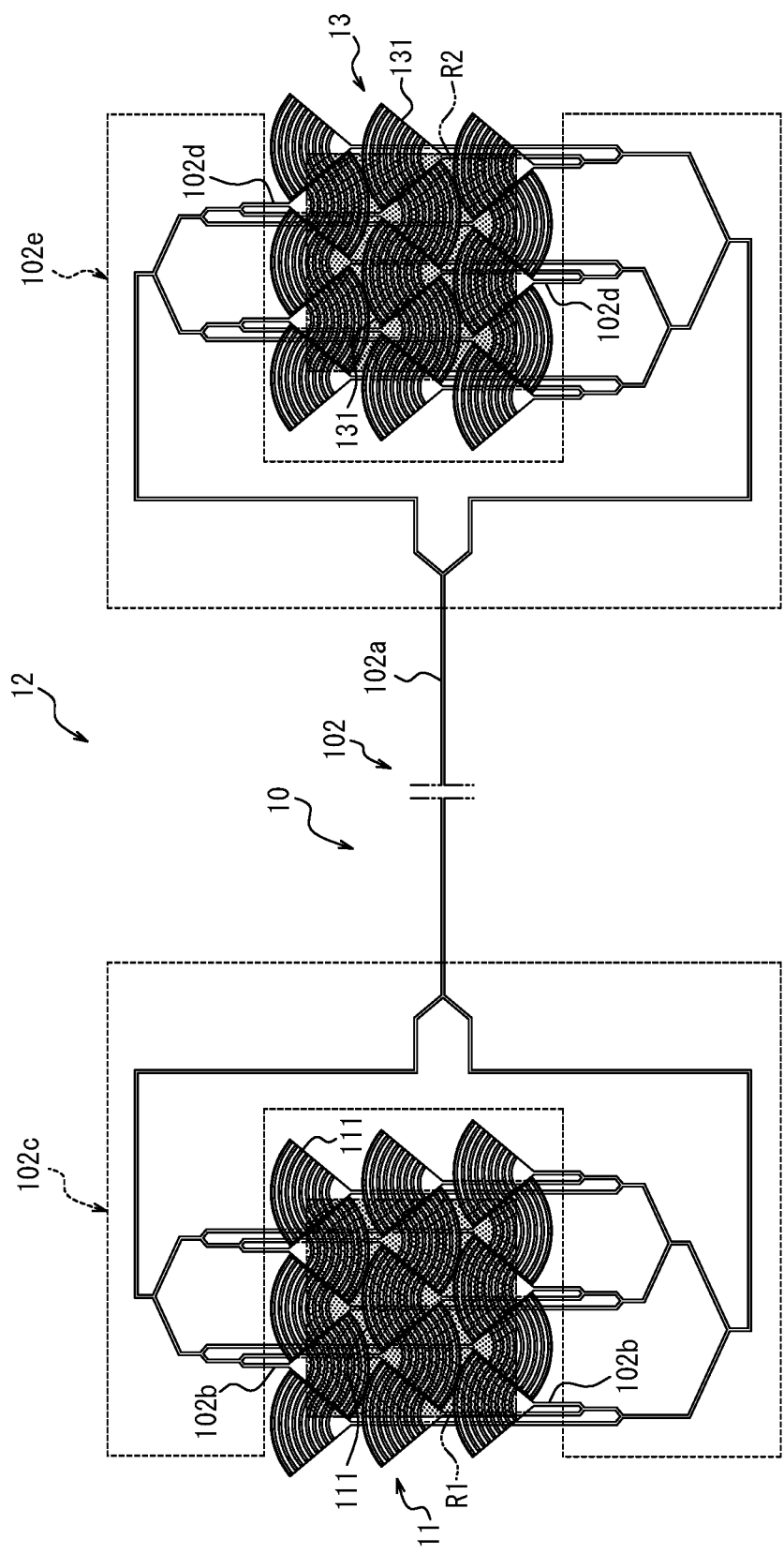
FIG. 14 is a plan view illustrating the optical waveguide used in an optical density measuring apparatus according to a second embodiment of the present disclosure from a light source side or a photodetector side.
Figure 16:
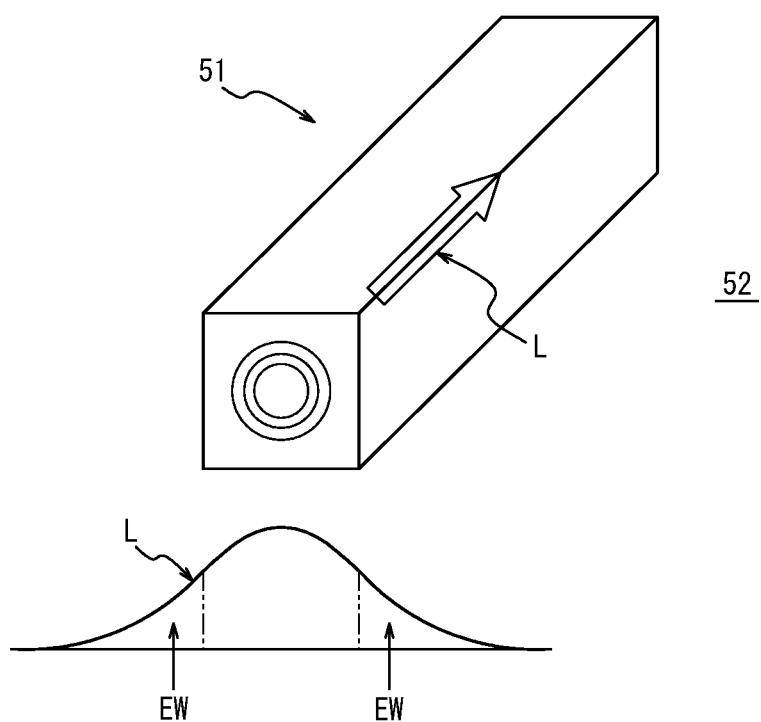
FIG. 16 illustrates an evanescent wave of light propagating through the optical waveguide.

An optical waveguide according to a second embodiment of the present disclosure is described next with reference to FIG. 14. Constituent elements that are the same as in the first embodiment are labeled with the same reference signs, and a description thereof is omitted.

In the second embodiment, a light propagation unit 10 includes at least one branched propagation channel 102 as a propagation channel 103. The branched propagation channel 102 includes a linear portion 102a positioned in the central region, a plurality of first diffraction grating side portions 102b that take in the light received by a plurality of first diffraction gratings 111, a converging portion 102c where propagation channels from the plurality of first diffraction grating side portions 102b to the linear portion 102a converge, and a second diffraction grating side portion 102d that guides the light propagated through the linear portion 102a towards a second diffraction grating unit 13. Specifically, in the branched propagation channel 102, the linear portion 102a positioned in the central region forms one propagation channel, and the first diffraction grating side portions 102b on the first diffraction grating side form propagation channels for connection to the first diffraction gratings 111. Furthermore, the propagation channels from the first diffraction grating side portions 102b towards the linear portion 102a converge in the converging portion 102c.

In the illustrated example, the light propagation unit 10 has only one branched propagation channel 102, which includes the one linear portion 102a, the same number of first diffraction grating side portions 102b as the number of first diffraction gratings 111 in the first diffraction grating unit 11 (15 in the illustrated example), and the converging portion 102c to converge from the plurality of first diffraction grating side portions 102b towards the linear portion 102a. As long as the light propagation unit 10 includes at least one branched propagation channel 102, however, the remaining propagation channels may have any form in the second embodiment. When the plurality of first diffraction grating side portions 102b of the branched propagation channel 102 are each connected to one first diffraction grating 111, the number of first diffraction grating side portions 102b of the branched propagation channel 102 may be the same as the number of first diffraction gratings 111 in the first diffraction grating unit 11 or only a portion thereof.

In the second embodiment, the manner in which the converging portion 102c causes the propagation channels to converge is not restricted, as long as the light received by the plurality of first diffraction gratings 111 can be combined and guided to the linear portion 102a of the branched propagation channel 102. For example, the propagation channels of the plurality of first diffraction grating side portions 102b may converge in stages, as illustrated. While omitted from the drawings, all of the first diffraction grating side portions 102b may instead converge at once. Specifically, in the illustrated example, two propagation channels at a time converge from the first diffraction grating side portions 102b towards the linear portion 102a, and 14 convergence points are located in the converging portion 102c.

The light propagated through the linear portion 102a in the second embodiment can be guided to the second diffraction grating unit 13 via the second diffraction grating side portions 102d. Specifically, the illustrated example includes a plurality of second diffraction grating side portions 102d. Furthermore, a branching portion 102e in which the propagation channel branches from the linear portion 102a to the plurality of second diffraction grating side portions 102d is provided between the linear portion 102a and the second diffraction grating side portions 102d. Like the converging portion 102c, the branching portion 102e may branch the propagation channel to the plurality of second diffraction grating side portions 102d in stages, as illustrated. While omitted from the drawings, the propagation channel may be branched to all of the second diffraction grating side portions 102d at once. In greater detail, the propagation channel is branched into two channels at a time from the linear portion 102a towards the second diffraction grating side portions 102d, and 14 branch points are located in the branching portion 102e in the illustrated example.

While the branching portion 102e is provided in the illustrated example, the branching portion 102e may be omitted, one light propagation unit 10 may be adopted, and the light from the linear portion 102a may be guided to the second diffraction grating unit 13 via one second diffraction grating side portion 102d.

As a result of the light propagation unit 10 including the branched propagation channel 102 in the second embodiment, the propagation channels of the light propagation unit 10 do not become complex even if a plurality of first diffraction gratings 111 are provided, and the light propagation unit 10 can be made more compact.

The branched propagation channel 102 of the light propagation unit 10 of the second embodiment may form the optical waveguide 15 of the first embodiment instead of or in addition to the light propagation unit 10 of the optical waveguide 15.

The optical waveguide 15 according to the second embodiment can be manufactured with a similar method to the aforementioned method of manufacturing the optical waveguide 15 according the first embodiment.

INDUSTRIAL APPLICABILITY

A more accurate optical density measuring apparatus and optical waveguide that increase the degree of design freedom can be provided with the present disclosure.

The invention claimed is:

1. An optical density measuring apparatus for measuring density of a gas or a liquid to be measured, the optical density measuring apparatus comprising:
a light source capable of irradiating light into a core layer;
a detector capable of receiving light propagated through the core layer; and
an optical waveguide;
wherein the optical waveguide comprises:
a substrate; and
the core layer comprising a diffraction grating unit and a light propagation unit capable of propagating light in an extending direction of the light propagation unit;
wherein the diffraction grating unit and a portion of the core layer are separated in a thickness direction of the optical waveguide by a substance having a refractive index lower than refractive indexes of the diffraction grating unit and the core layer, and
the thickness direction is orthogonal to the extending direction of the light propagation unit.

2. The optical density measuring apparatus of claim 1, wherein a separation distance CL measured along the thickness direction of the optical waveguide between the diffraction grating unit and the portion of the core layer separated from the diffraction grating unit satisfies Expression (1), $$CL \geq \frac{3\lambda}{2\pi\sqrt{n_{core}^2 - n_{clad}^2}} \quad (1)$$

where $\lambda$ represents an average wavelength of light in a vacuum, $n_{core}$ represents a refractive index of a material forming the portion of the core layer, and $n_{clad}$ represents a refractive index of a material located in a separation portion between the diffraction grating unit and the portion of the core layer separated from the diffraction grating unit.

3. The optical density measuring apparatus of claim 1, wherein a separation distance CL measured along the thickness direction of the optical waveguide between the diffraction grating unit and the portion of the core layer separated from the diffraction grating unit satisfies Expression (2), $$CL \geq \left(\frac{1}{2}\ln\frac{\lambda L_{Gr}}{\pi n_{core}d^2}\right)\frac{\lambda}{2\pi\sqrt{n_{core}^2 - n_{clad}^2}} \quad (2)$$

where $\pi$ represents an average wavelength of light in a vacuum, $n_{core}$ represents a refractive index of a material forming the portion of the core layer, $n_{clad}$ represents a refractive index of a material located in a separation portion between the diffraction grating unit and the portion of the core layer separated from the diffraction grating unit, d represents a minimum film thickness of the portion of the core layer, and $L_{Gr}$ is a sum of a diffraction grating length of the diffraction grating unit separated from the portion of the core layer.

4. The optical density measuring apparatus of claim 1, wherein a separation distance CL measured along the thickness direction of the optical waveguide between the diffraction grating unit and the portion of the core layer separated from the diffraction grating unit is 0.7 µm or more.

5. The optical density measuring apparatus of claim 1, wherein the portion of the core layer separated from the diffraction grating unit has a thickness of 0.3 µm or more at a position where the portion of the core layer is separated from the diffraction grating unit in the thickness direction.

6. The optical density measuring apparatus of claim 1, wherein the diffraction grating unit and the portion of the core layer separated from the diffraction grating unit are formed from different materials.

7. The optical density measuring apparatus of claim 1, wherein the diffraction grating unit comprises a first diffraction grating unit configured to receive light from the light source and guide the light towards the light propagation unit.

8. The optical density measuring apparatus of claim 7, wherein the first diffraction grating unit is disposed near to and facing a light-emitting surface of the light source; and
wherein the first diffraction grating unit comprises a plurality of first diffraction gratings, and at least two first diffraction gratings among the plurality of first diffraction gratings are configured to receive light emitted from a same light-emitting surface of the light source.

9. The optical density measuring apparatus of claim 8, wherein the plurality of first diffraction gratings in the first diffraction grating unit are arranged periodically in plan view.

10. The optical density measuring apparatus of claim 8, wherein at least one first diffraction grating among the plurality of first diffraction gratings has a maximum diffraction grating length of 20$\lambda$ or less, where $\lambda$ represents an average wavelength of light in a vacuum.

11. The optical density measuring apparatus of claim 8, wherein at least two first diffraction gratings among the plurality of first diffraction gratings in the first diffraction grating unit are connected to the light propagation unit in opposite directions in plan view.

12. The optical density measuring apparatus of claim 8, wherein the first diffraction grating unit is configured so that a ratio of a total area of the first diffraction gratings covered by the light-emitting surface of the light source to an area of the light-emitting surface is 60% or more.

13. The optical density measuring apparatus of claim 8, wherein the first diffraction grating unit is configured so that a ratio of a total area of the first diffraction gratings covered by the light-emitting surface of the light source to an area of the light-emitting surface is 80% or more.

14. The optical density measuring apparatus of claim 1, wherein a first portion that is a portion of the core layer is separated from the diffraction grating unit in the thickness direction of the optical waveguide, and a second portion that is a portion of the core layer is separated from the first portion in the thickness direction.

15. An optical waveguide for use in an optical density measuring apparatus for measuring density of a gas or a liquid to be measured, the optical waveguide comprising:
   a substrate; and
   a core layer comprising a diffraction grating unit and a light propagation unit capable of propagating light in an extending direction of the light propagation unit;
   wherein the diffraction grating unit and a portion of the core layer are separated in a thickness direction of the optical waveguide by a substance having a refractive index lower than refractive indexes of the diffraction grating unit and the core layer, and
   the thickness direction is orthogonal to the extending direction of the light propagation unit.

16. The optical waveguide of claim 15, wherein a separation distance CL measured along the thickness direction of the optical waveguide between the diffraction grating unit and the portion of the core layer separated from the diffraction grating unit satisfies Expression (3), $$CL \geq \frac{3\lambda}{2\pi\sqrt{n_{core}^2 - n_{clad}^2}} \quad (3)$$

where $\lambda$ represents an average wavelength of light in a vacuum, $n_{core}$ represents a refractive index of a material forming the portion of the core layer, and $n_{clad}$ represents a refractive index of a material located in a separation portion between the diffraction grating unit and the portion of the core layer separated from the diffraction grating unit.

17. The optical waveguide of claim 15, wherein a separation distance CL measured along the thickness direction of the optical waveguide between the diffraction grating unit and the portion of the core layer separated from the diffraction grating unit satisfies Expression (4), $$CL \geq \left(\frac{1}{2}\ln\frac{\lambda L_{Gr}}{\pi n_{core}d^2}\right)\frac{\lambda}{2\pi\sqrt{n_{core}^2 - n_{clad}^2}} \quad (4)$$

where $\lambda$ represents an average wavelength of light in a vacuum, $n_{core}$ represents a refractive index of a material forming the portion of the core layer, $n_{clad}$ represents a refractive index of a material located in a separation portion between the diffraction grating unit and the portion of the core layer separated from the diffraction grating unit, d represents a minimum film thickness of the portion of the core layer, and $L_{Gr}$ is a sum of a diffraction grating length of the diffraction grating unit separated from the portion of the core layer.

18. The optical waveguide of claim 15, wherein a separation distance CL measured along the thickness direction of the optical waveguide between the diffraction grating unit and the portion of the core layer separated from the diffraction grating unit is 0.7 μm or more.

* * * * *